US011359393B2

(12) United States Patent
Schubart et al.

(10) Patent No.: US 11,359,393 B2
(45) Date of Patent: Jun. 14, 2022

(54) SYSTEMS AND METHODS FOR ADDITIVE MANUFACTURING

(71) Applicant: Oshkosh Corporation, Oshkosh, WI (US)

(72) Inventors: Kai Schubart, Oshkosh, WI (US); Justin Madsen, Oshkosh, WI (US); Brandon Mich, Oshkosh, WI (US); Nicholas Sonnentag, Oshkosh, WI (US); Robert M. Hathaway, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 151 days.

(21) Appl. No.: 16/811,337

(22) Filed: Mar. 6, 2020

(65) Prior Publication Data

US 2020/0308854 A1    Oct. 1, 2020

Related U.S. Application Data

(60) Provisional application No. 62/823,150, filed on Mar. 25, 2019.

(51) Int. Cl.
*E04G 21/16* (2006.01)
*B33Y 50/02* (2015.01)
*B33Y 30/00* (2015.01)

(52) U.S. Cl.
CPC .............. *E04G 21/16* (2013.01); *B33Y 30/00* (2014.12); *B33Y 50/02* (2014.12)

(58) Field of Classification Search
CPC .......... E04G 21/16; B33Y 30/00; B33Y 50/02
See application file for complete search history.

(56) References Cited

U.S. PATENT DOCUMENTS

| 4,675,502 A | 6/1987 | Haefner et al. |
| 5,765,624 A | 6/1998 | Hathaway et al. |
| 8,794,886 B1 | 8/2014 | Nett et al. |
| 9,902,115 B1* | 2/2018 | Janson .................. B33Y 30/00 |
| 10,611,203 B1 | 4/2020 | Rositch et al. |
| 10,632,805 B1 | 4/2020 | Rositch et al. |
| 2011/0120293 A1 | 5/2011 | Venton-Walters et al. |
| 2019/0091890 A1 | 3/2019 | Rocholl et al. |
| 2019/0178329 A1 | 6/2019 | Dumitru et al. |
| 2019/0315016 A1 | 10/2019 | Post et al. |
| 2020/0198318 A1* | 6/2020 | Ford ..................... B33Y 80/00 |

FOREIGN PATENT DOCUMENTS

| CN | 204936233 U | * | 1/2016 |
| CN | 205439277 U | * | 8/2016 |

* cited by examiner

*Primary Examiner* — Yung-Sheng M Tsui
(74) *Attorney, Agent, or Firm* — Foley & Lardner LLP

(57) ABSTRACT

An additive manufacturing system for producing a structure includes a base assembly, an elongated member, a carriage, and a first member. The elongated member is fixedly coupled with the base assembly and extends upwards from the base assembly. The carriage is rotatably coupled with the elongated member and configured to translate upwards along the elongated member. The first member is fixedly coupled with and extends outwards from the carriage. The first member includes a material dispensing device configured to dispense material as the carriage rotates relative to the elongated member.

19 Claims, 20 Drawing Sheets

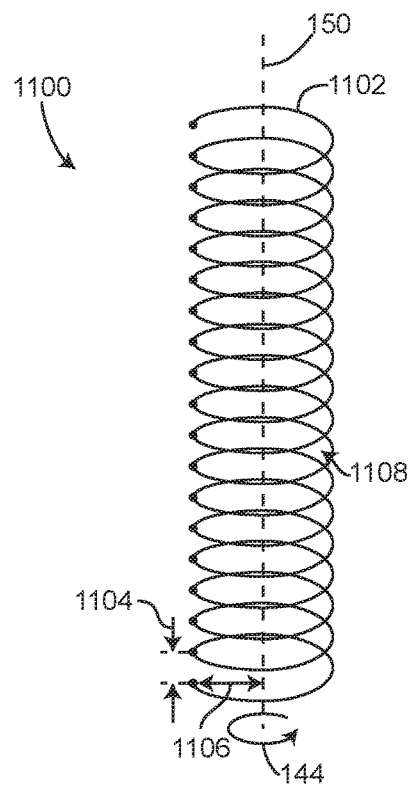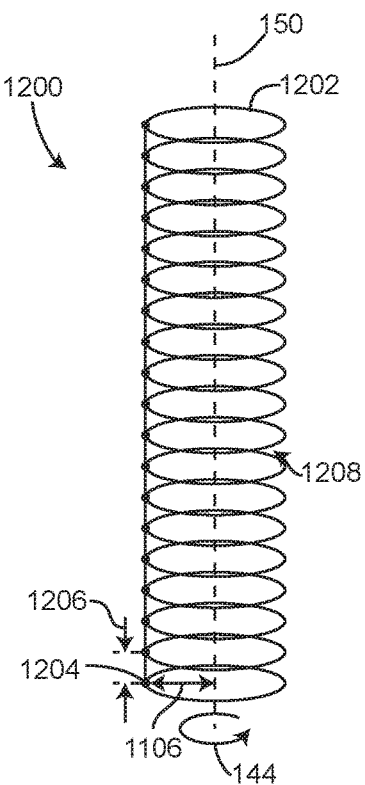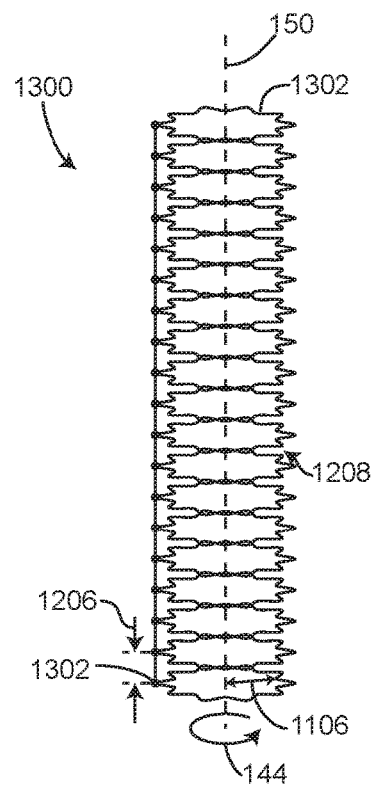
FIG. 11   FIG. 12   FIG. 13
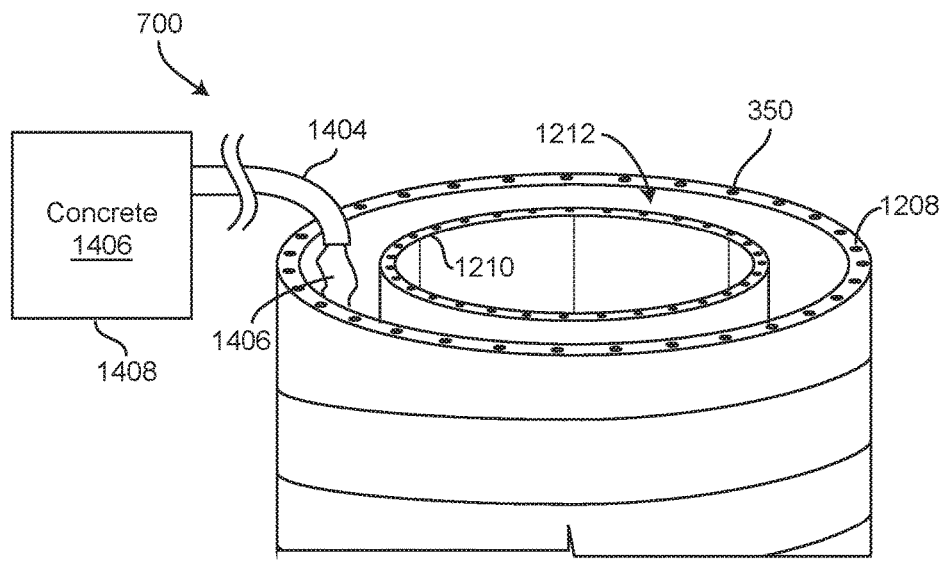
FIG. 14

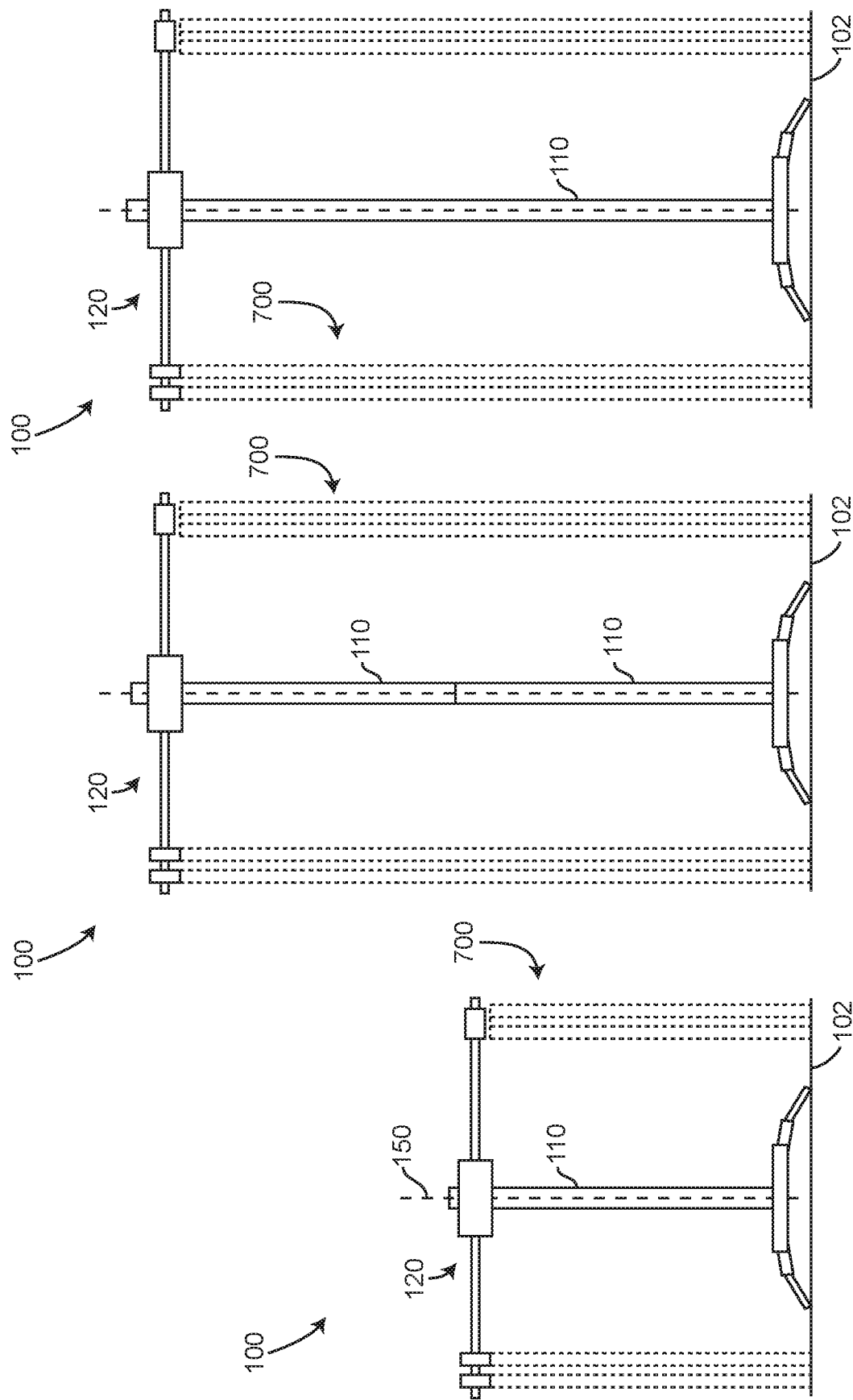

SYSTEMS AND METHODS FOR ADDITIVE MANUFACTURING

CROSS-REFERENCE TO RELATED PATENT APPLICATION

This application claims the benefit of and priority to U.S. Provisional Patent Application No. 62/823,150, filed Mar. 25, 2019, the entire disclosure of which is incorporated by reference herein.

BACKGROUND

The present disclosure relates to additive manufacturing. More specifically, the present disclosure relates to additive manufacturing systems and methods for commercial applications.

SUMMARY

One implementation of the present disclosure is an additive manufacturing system for producing a structure, according to an exemplary embodiment. The additive manufacturing system includes a base assembly, an elongated member, a carriage, and a first member. The elongated member is fixedly coupled with the base assembly and extends upwards from the base assembly. The carriage is rotatably coupled with the elongated member and configured to translate upwards along the elongated member. The first member is fixedly coupled with and extends outwards from the carriage. The first member includes a material dispensing device configured to dispense material as the carriage rotates relative to the elongated member.

Another implementation of the present disclosure is an additive manufacturing system for producing a structure, according to an exemplary embodiment. The system includes a central member, a carriage, a first material dispensing device, and a rotary union. The central member includes an inner passageway fluidly coupled with a reservoir of a material. The carriage is rotatably coupled with the central member and configured to rotate relative to the central member and translate upwards along the central member. The first member extends from the carriage and includes a passageway. The first material dispensing device is configured to receive the material from the passageway of the first member and dispense the material as the carriage and the first member rotate relative to the central member. The rotary union is configured to fluidly couple the inner passageway of the central member with the passageway of the first member as the carriage and the first member rotate relative to the central member.

Another implementation of the present disclosure is an assembly for an additive manufacturing system, according to an exemplary embodiment. The assembly includes a carriage, a first elongated member, and multiple material dispensing devices. The carriage is configured to rotatably couple with a central member. The first elongated member extends from the carriage. The multiple material dispensing devices are configured to receive a concrete material through a passageway of the first elongated member and dispense the concrete material. The carriage and the first elongated member are configured to rotate relative to the central member as the plurality of material dispensing devices dispense the concrete material along a path.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which:

FIG. 11 is a perspective view of a path that one or more print heads of the additive manufacturing system of FIG. 1 can follow during operation of the additive manufacturing system, according to an exemplary embodiment.

FIG. 12 is a perspective view of a path that one or more print heads of the additive manufacturing system of FIG. 1 can follow during operation of the additive manufacturing system, according to an exemplary embodiment.

FIG. 13 is a perspective view of a path that one or more print heads of the additive manufacturing system of FIG. 1 can follow during operation of the additive manufacturing system, according to an exemplary embodiment.

FIG. 14 is a perspective view of part of a structure produced by the additive manufacturing system of FIG. 1, with material being poured between an inner sidewall and an outer sidewall of the structure, according to an exemplary embodiment.

FIG. 15 is a side view of the additive manufacturing system of FIG. 1, with a central column having a first height, according to an exemplary embodiment.

FIG. 16 is a side view of the additive manufacturing system of FIG. 1, with a central column having a second overall height that is achieved by assembling multiple smaller central columns, according to an exemplary embodiment.

FIG. 17 is a side view of the additive manufacturing system of FIG. 1, with a single central column having the second overall height, according to various exemplary embodiments.

DETAILED DESCRIPTION

Figure 1:
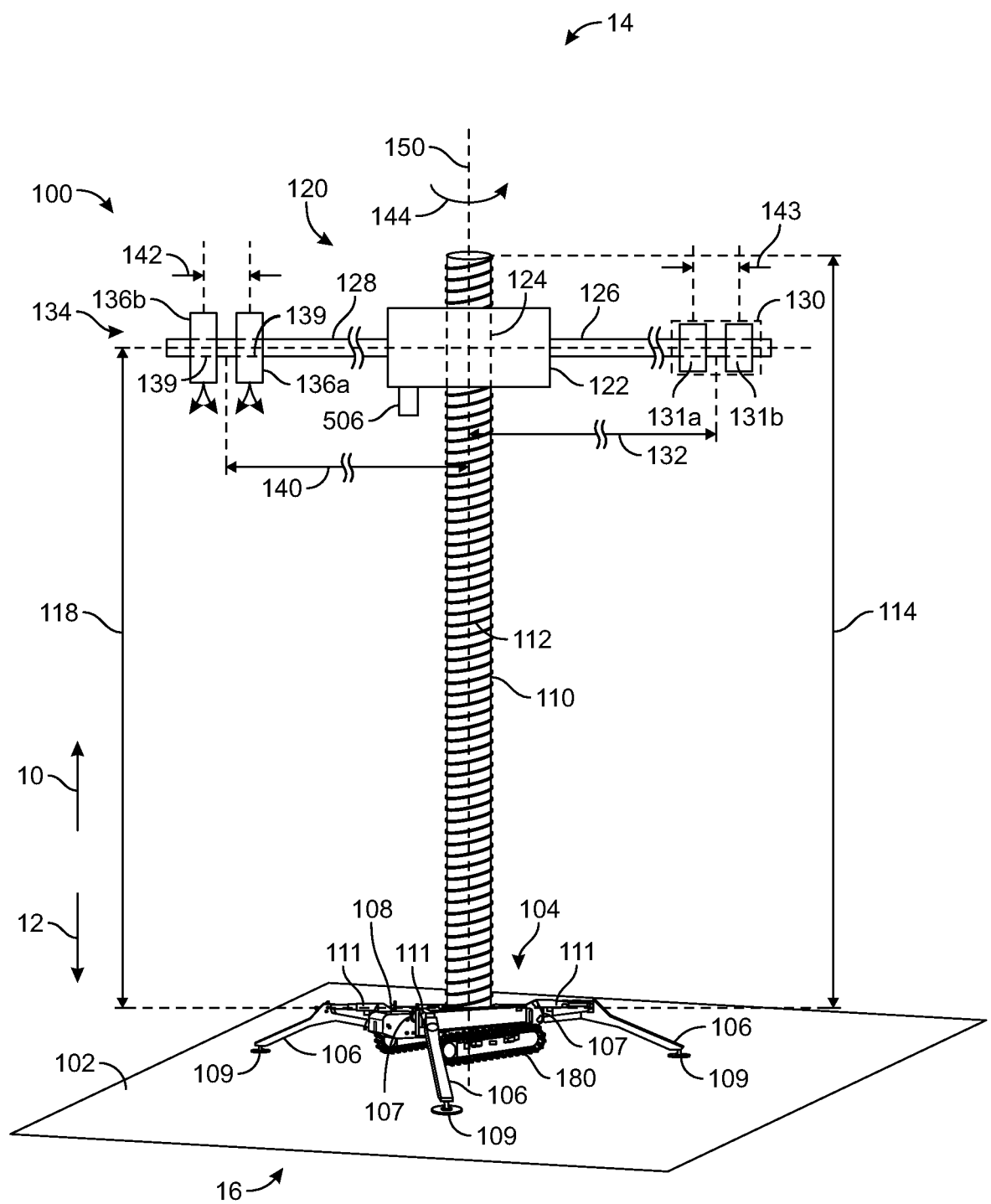
FIG. 1 is a perspective view of an additive manufacturing system configured to produce a structure, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, an additive manufacturing system includes a base assembly, a central column (e.g., an elongated member), and a delivery system. The delivery system includes a frame configured to threadingly couple with threads of the central column. The frame includes a primary mover (e.g., a motor, a roller, a drive shaft, a gear train and an engine/motor, etc.) configured to impart rotational motion to the frame relative to the central column. The rotation of the frame relative to the central column and the threaded coupling between the frame and the central column causes the delivery system to translate along the central column in a first direction (e.g., upwards) in response to rotation of the frame in a first direction (e.g., clockwise), and to translate along the central column in a second direction (e.g., downwards) in response to rotation of the frame in a second direction (e.g., counter-clockwise). In this way, the delivery system can be translated in either direction along the central column due to rotation of the frame and the threaded coupling between the frame and the central column.

The delivery system includes a first and a second member that extend radially outwards from either end of the frame. The first and the second member may extend radially outwards from either end of the frame relative to a central axis of the central column. The first and the second member may have a similar or same radial length. The second member includes one or more print heads configured to dispense concrete or a slurry material. The first member includes an apparatus configured to provide a structural support material (e.g., rebar) to a top surface of the concrete/slurry material dispensed by the one or more printheads. The apparatus may translate along substantially an entire length of the first member. The one or more print heads may independently translate along substantially an entire length of the second member.

The base assembly can include one or more support legs that can articulate and/or extend. The support legs are configured to hingedly couple with each other and/or with a frame of the base assembly. The support legs can be articulated via a primary mover such as a hydraulic cylinder, or any other device/apparatus that can extend or retract to articulate the legs. The support legs may be configured to adjust an orientation of the additive manufacturing system to level the additive manufacturing system. The support legs can be controlled by a controller having a processor, a processing circuit, and memory.

Before operation of the additive manufacturing system, the delivery system can be driven such that it is at a starting point. The starting point may be a lower end of the central column.

During operation of the additive manufacturing system, the frame of the delivery system is driven to rotate relative to the central column. Due to the threaded coupling between the frame and the central column, the delivery system translates upwards along the central column and rotates about the central axis of the column. Concrete can be continuously dispensed/poured by the one or more printheads. The apparatus that provides the structural support member can provide the structural support member between tracks of concrete laid by the one or more printheads. The concrete is continuously provided by the one or more printheads in consecutive layers. The path travelled by the one or more printheads (and therefore the path over which the concrete is dispensed) may be substantially spiral. In this way, a generally cylindrical concrete structure with integrated structural support members is produced. The structural support member is integrated (e.g., sandwiched) between subsequent layers of the concrete provided by the one or more printheads.

The operations of the additive manufacturing system can be controlled/operated by the controller. The controller can be configured to receive one or more user inputs indicating a desired height of the structure, the desired diameter/radius of the structure, etc. The controller can operate the additive manufacturing system to produce the structure with the desired diameter/radius by causing the one or more printheads to dispense the concrete while simultaneously causing the primary mover to rotate the frame relative to the central column.

Additional central column sections can be installed to the top of the central column section. In this way, a structure having any height can be produced by the additive manufacturing system. Additionally, the first member and the second member are configured to hingedly couple with the frame such that the first member and the second member can be rotated downwards to reduce the size of the additive manufacturing system for transportation.

Before the controller causes the additive manufacturing system to produce the structure, the controller may receive orientation information from an orientation sensor (e.g., a gyroscope). The controller can operate the support legs to articulate and/or extend such that the additive manufacturing system is substantially vertical and therefore the structure produced is not tilted.

The additive manufacturing system can be used to produce concrete silos, water pipes, towers, wind tower pedestals, columns, etc. The one or more printheads may each produce a wall of the structure, with one or more volumes defined between neighboring walls. Concrete can be poured into the inner volumes defined between the neighboring walls to produce a structure that has substantially solid walls with integrated structural support members (e.g., rebar).

The controller can cause a human machine interface (HMI) to notify a user once the structure is completed. Advantageously, the additive manufacturing system can be used to automatically produce various concrete structures. This reduces time, cost, and man-power associated with producing concrete structures (e.g., towers). Additionally, the one or more print heads can be translated along the second member such that structures of various diameters/radii can be printed/produced. Furthermore, structures with multiple walls can be produced/printed by the additive manufacturing system. The one or more print heads of the additive manufacturing system can be configured to dispense/print concrete in either slip form or free form.

Advantageously, the additive manufacturing system can be used for commercial or construction applications. The additive manufacturing system can be used to produce large-scale (e.g., greater than 10 feet, greater than 50 feet, greater than 100 feet, etc.) structures. After the structure is produced, the additive manufacturing system can be lifted out through the top of the structure (e.g., via a crane, a jib-crane, etc.).

The controller can be configured to use a structure model to determine or define one or more paths for the printheads. The controller may also use sensor data obtained from a vision system, a camera, infrared lasers, etc., to operate the additive manufacturing system so that the printheads follow a previous layer while dispensing material. The controller can operate a pump or an auger of the additive manufacturing system so that material (e.g., concrete) is provided to the printheads at a feed rate. The feed rate can be determined based on a rheological property of the material that can be obtained from a rheological sensor or provided to the controller from a user. The controller can also determine a speed for the pump or the auger in combination with a relative vertical distance between the printheads and the previous layer to achieve a desired amount of output pressure or downwards vertical force of the material as it is dispensed. Providing the material at a feed rate and at a relative vertical distance can facilitate improved engagement and bonding between the previous layer and the currently dispensed layer.

Referring to FIG. 1, an additive manufacturing system 100 includes a base, a support member, a stand, a tripod, a support structure, a platform, a stage, a pedestal, etc., shown as base assembly 104, according to an exemplary embodiment. Additive manufacturing system 100 is configured to perform additive manufacturing with a material such as concrete, cement, asphalt, etc., or any other material that can be provided in a semi-liquid state and cures/hardens (e.g., a slurry). In an exemplary embodiment, additive manufacturing system 100 uses concrete. Base assembly 104 is configured to provide structural support for additive manufacturing system 100. Base assembly 104 is configured to rest (e.g., sit upon, rest upon, interface with, etc.) on a ground surface 102.

A rod, beam, bar, support member, cylindrical member, elongated member, mast, cylinder, central member, shaft, etc., shown as elongated member 110 extends outwards in at least one direction from base assembly 104. A delivery system 120 (e.g., an assembly) is coupled to elongated member 110 and is configured to travel along at least a portion of longitudinal length 114 of elongated member 110. Elongated member 110 is configured to provide structural support for delivery system 120. Elongated member 110 defines central axis 150 that extends through a center of elongated member 110. Central axis 150 is a longitudinal axis.

Elongated member 110 can include threads 112 disposed along at least a portion of longitudinal length 114. In an exemplary embodiment, threads 112 extend along substantially the entirety of longitudinal length 114 of elongated member 110. Threads 112 may have a pitch diameter $P_d$. In some embodiments, elongated member 110 includes annular and/or longitudinal grooves. Elongated member 110 may include the annular and/or longitudinal grooves instead of threads 112.

Elongated member 110 can be rotatably coupled with an aperture of base assembly 104, according to some embodiments. In other embodiments, elongated member 110 is fixedly coupled with base assembly 104. In still other embodiments, elongated member 110 is threadingly coupled with base assembly 104 via threads 112 or other threads (e.g., threads having a different pitch diameter $P_d$) extending along a portion of longitudinal length 114 of elongated member 110 near a bottom end 16 of elongated member 110.

It should be noted that as use herein, the term "bottom" "lower most" etc., refer to bottom end 16 of additive manufacturing system 100, while the term "top" "upper most" etc. refer top end 14 of additive manufacturing system 100. Likewise, the terms "up" "upwards" etc., refer to direction 10, and the terms "down" "downwards" etc. refer to direction 12.

Base assembly 104 includes legs, extendable members, support members, support legs, stand legs, feet, telescoping members, articulated arms, braces, arms, etc., shown as support members 106. Support members 106 extend from a base member, a carriage, a carrier, a frame, a stand, etc., of base assembly 104, shown as base member 108. Support members 106 may extend outwards from base member 108. Any number of support members 106 may be used. For example, three support members 106 may extend from base member 108, thereby defining base assembly 104 as a tripod assembly. Support members 106 may be extendable support members (e.g., having one or more telescoping sections that are extendable and retractable). Support members 106 can also include one or more hinges or joints, shown as hinged interface 107 between various sections/portions of each of support members 106 (e.g., between inner and outer sections). For example, support members 106 may include a first portion (e.g., a first arm) and a second portion (e.g., a second arm) hingedly coupled at hinged interface 107. The second portion can be driven to rotate about the hinged interface 107 relative to the first portion via a hydraulic cylinder 111 (e.g., a piston cylinder), a motor, an engine, etc. Support members 106 can each include a support pad 109 at an end of an outer most section of support member 106. Support pads 109 are configured to contact, engage, abut, etc., ground surface 102. Support pads 109 may provide a surface area to distribute the weight of additive manufacturing system 100 on ground surface 102. Support pads 109 may prevent additive manufacturing system 100 from tipping during operation.

Base assembly 104 includes one or more wheels, treads, etc., shown as tractive elements 180, according to an exemplary embodiment. Tractive elements 180 facilitate transportation of additive manufacturing system 100. In some embodiments, tractive elements 180 facilitate transportation of additive manufacturing system 100 over short distances. For example, tractive elements 180 can facilitate transportation of additive manufacturing system 100 along ground surface 102 to accurately position additive manufacturing system 100 (e.g., to fine tune the position of additive manufacturing system 100 along ground surface 102). In some embodiments, additive manufacturing system 100 does not include tractive elements 180. Tractive elements 180 can receive power from a primary mover (e.g., an engine, a motor, a hydraulic system, etc.). The power from the primary mover can be transferred via a power train (e.g., gears, belts, shafts, etc.). The primary mover can be operated by controller 500 to transport additive manufacturing system 100 over short distances.

Delivery system 120 is coupled with elongated member 110 and is configured to move (e.g., translate) along substantially the entirety of longitudinal length 114 of elongated member 110. Delivery system 120 includes a base, frame, support member, mast, carriage, carrier, etc., shown as frame 122. Frame 122 includes an aperture, hole, bore, receiving portion, inner volume, etc., shown as aperture 124 that extends into frame 122. Frame 122 can be rotatably and/or translatably coupled with elongated member 110 (e.g., via aperture 124).

Aperture 124 may have a circular cross-sectional shape. Apertures 124 extends through substantially an entire height of frame 122 (e.g., an entire longitudinal height). In an exemplary embodiment, aperture 124 includes threads configured to threadingly couple with threads 112 of elongated member 110. Frame 122 can translate in direction 10 or direction 12 along substantially the entirety of longitudinal length 114 of elongated member 110. In some embodiments, frame 122 is configured to rotate relative to elongated member 110 about central axis 150 in direction 144 or in a direction opposite direction 144. The threaded coupling between aperture 124 and threads 112 of elongated member 110 facilitates translation of frame 122 in direction 10 or direction 12 as frame 122 rotates about central axis 150 relative to elongated member 110. In some embodiments, as frame 122 rotates relative to elongated member 110 in direction 144 about central axis 150, frame 122 translates in direction 10 (i.e., upwards). Likewise, as frame 122 rotates in a direction opposite direction 144 about central axis 150 with respect to elongated member 110, frame 122 translates in direction 12 with respect to elongated member 110. In other embodiments, as frame 122 rotates in direction 144 about central axis 150, frame 122 translates in direction 12 (e.g., downwards). Frame 122 is disposed a longitudinal distance 118 from base member 108. During operation (e.g., during the laying of concrete), delivery system 120 rotates about central axis 150 and moves in direction 10, thereby increasing longitudinal distance 118. At a starting of operation, longitudinal distance 118 may be substantially equal to zero such that the concrete is laid directly to ground surface 102 or to gravel, sand, etc., on ground surface 102.

In other embodiments, elongated member 110 does not include threads 112. During operation, delivery system 120 may rotate 360 degrees (e.g., a full revolution) and lay concrete throughout the entire rotation to form a first layer. Delivery system 120 can then translate along elongated member 110 in direction 10 a predetermined distance (e.g., a height of the layer of concrete provided). After delivery system 120 has translated along elongated member 110 the predetermined amount, delivery system 120 can perform another revolution and lay concrete to form a second layer. Delivery system 120 may repeat this process until the entire structure has been produced.

In some embodiments, for every completed revolution of frame 122 about central axis 150 relative to elongated member 110, delivery system 120 translates a predetermined distance in either direction 10 or direction 12. The predetermined distance is proportional to the pitch diameter $P_d$ of threads 112 of elongated member 110. The pitch diameter $P_d$ of threads 112 can be adjusted to achieve various values of the predetermined distance that frame 122 travels with every revolution. In other embodiments, delivery system 120 does not translate along elongated member 110 (e.g., in direction 10) as frame 122 rotates. Delivery system 120 may rotate a complete revolution, then translate along elongated member 110, then perform another rotation, then translate along elongated member 110, etc., until the structure is completed.

Figure 3:
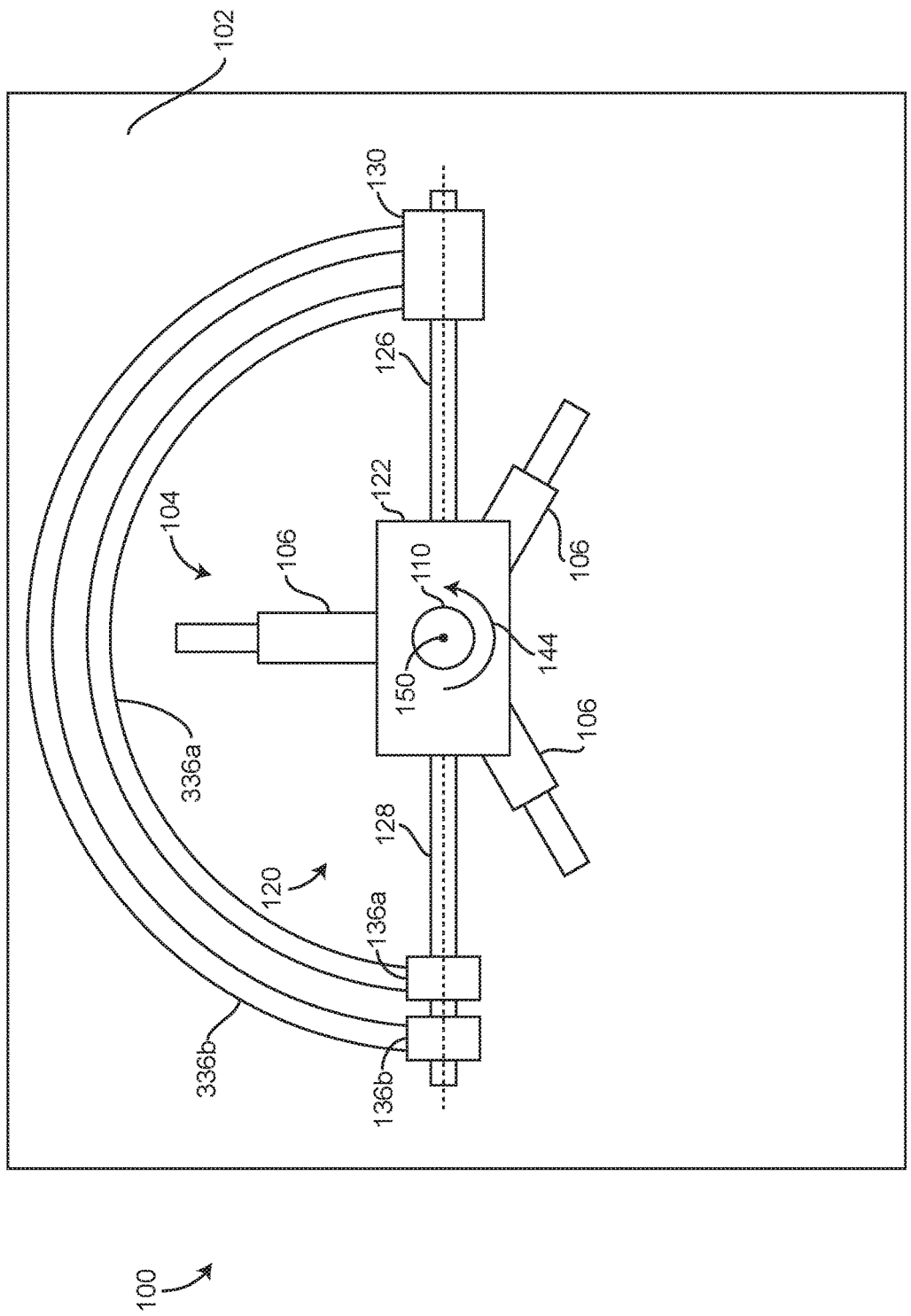
FIG. 3 is a top view of the additive manufacturing system of FIG. 1 after performing a first half of a first revolution to partially lay a first layer of material, according to an exemplary embodiment.

Delivery system 120 includes a first bar, support member, arm, beam, cantilever beam, elongated member, etc., shown as first member 126. Delivery system 120 includes a second bar, support member, arm beam, cantilever beam, elongated member, etc., shown as second member 128. First member 126 and second member 128 extend outwards from frame 122. First member 126 and second member 128 extend radially outwards from central axis 150. In some embodiments, first member 126 and second member 128 extend outwards in opposite directions (e.g., an angle 175 defined between first member 126 and second member 128 measured about central axis 150 is 180 degrees as shown in FIG. 3). In other embodiments, first member 126 and second member 128 extend radially outwards from central axis 150 and are angularly offset about central axis 150 (e.g., angle 175 as shown in FIG. 3 is less than 180 degrees or greater than 180 degrees).

First member 126 and second member 128 may have a similar overall length. First member 126 includes a nozzle assembly 134 (e.g., a print head assembly). Second member 128 includes a structural support delivery device 130 (e.g., a structural support delivery device, a structural support dispensing apparatus, etc.). Structural support delivery device 130 is configured to output (e.g., lay, drive, etc.) a structural support member as frame 122 rotates about central axis 150. Structural support delivery device 130 incudes one or more driving devices 131 configured to drive or lay the structural support member into the concrete laid by concrete delivery devices 136 (e.g., material dispensing devices, discharge devices, etc.). Structural support delivery device 130 may include a same number of driving devices 131 as concrete delivery devices 136. For example, structural support delivery device 130 may include driving device 131a and driving device 131b. Driving device 131a corresponds to concrete delivery device 136a and is configured to provide structural support members into layers provided by concrete delivery device 136a. Likewise, driving device 131b corresponds to concrete delivery device 136b and is configured to provide structural support members into layers provided by concrete delivery device 136b. In some embodiments, first member 126 and second member 128 extend radially outwards from central axis 150 and the weights of nozzle assembly 134 and structural support delivery device 130 produce moments that at least partially counter each other (e.g., to reduce tipping of additive manufacturing system 100). Nozzle assembly 134 includes a first and second nozzle, delivery device, spout, printhead, etc. shown as concrete delivery device 136a, and concrete delivery device 136b.

Concrete delivery device 136a and concrete delivery device 136b are coupled to second member 128. Concrete delivery device 136a and concrete delivery device 136b may both include a bore, hole, aperture, etc., shown as aperture 139. Concrete delivery device 136a and concrete delivery device 136b are coupled to second member 128. Concrete delivery device 136a and concrete delivery device 136b are configured to translate along at least a portion of an overall length of second member 128. Concrete delivery device 136a and concrete delivery device 136b may be coupled with second member 128 via an interface or coupling between an outer periphery of second member 128 and apertures 139. In some embodiments, concrete delivery device 136a and concrete delivery device 136b hang from second member 128. Concrete delivery device 136a and concrete delivery device 136b may be configured to ride along a track that extends along substantially an entire length of second member 128. Concrete delivery device 136a and concrete delivery device 136b can be configured to provide concrete/print in either slip form or free form.

In some embodiments, concrete delivery device 136a and concrete delivery device 136b can be locked in a current position (e.g., selectively fixedly coupled with second member 128). For example, concrete delivery device 136a and concrete delivery device 136b may include a pinned coupling including a pin that can be removed to facilitate translation along second member 128 and inserted to lock a current position of concrete delivery device 136a and concrete delivery device 136b along second member 128.

Concrete delivery device 136a and concrete delivery device 136b are configured to dispense, pour, provide, emit, drive, etc., concrete therebelow, according to an exemplary embodiment. Concrete delivery device 136a and concrete delivery device 136b can each provide concrete out through a bottom aperture (e.g., in direction 12) as frame 122 rotates about central axis 150 and translates in direction 10 or direction 12. As delivery system 120 rotates about central axis 150 and translates (e.g., upwards, in direction 10 relative to elongated member 110), concrete is dispensed by concrete delivery device 136a and concrete delivery device 136b to produce layers of concrete (or whatever material concrete delivery device 136a and concrete delivery device 136b dispense such as cement).

Structural support delivery device 130 can dispense, provide, etc., a structural support member to the layers of concrete via driving devices 131. Structural support delivery device 130 may provide a steel reinforcing bar (e.g., rebar) into and/or on top of one or more layers of concrete provided by concrete delivery device 136a and concrete delivery device 136b. The operation of additive manufacturing system 100 according to some embodiments is described in greater detail below with reference to FIGS. 3-9.

Structural support delivery device 130 can provide the structural support member at various radial distances relative to central axis 150. In some embodiments, a current radial distance between each of concrete delivery devices 136 is the same as a current radial distance between a corresponding driving device 131. For example, driving device 131a corresponds to concrete delivery device 136a and can translate along first member 126 such that the radial distance between central axis 150 and concrete delivery device 136a is substantially equal to the radial distance between central axis 150 and driving device 131a. This facilitates providing the structural support member(s) into the concrete/material provided by concrete delivery device 136a. In some embodiments, structural support delivery device 130 (or any of driving devices 131) is/are configured to translate along first member 126 in either direction (e.g., in a direction towards frame 122 or in a direction away from frame 122).

Concrete delivery device 136a and concrete delivery device 136b are disposed a distance 142 apart along second member 128. It should be understood that while concrete delivery device 136a and concrete delivery device 136b are shown as separate components, concrete delivery device 136a and concrete delivery device 136b may both be disposed within a single housing. Concrete delivery device 136a is configured to continuously (e.g., throughout operation, throughout multiple revolutions of delivery system 120, throughout each revolution of delivery system 120, etc.) provide concrete to produce a first wall of concrete. Concrete delivery device 136a provides the concrete continuously (or intermittently) as delivery system 120 rotates about central axis 150 and translates in direction 10. Concrete delivery device 136a can thereby provide concrete in a spiral pattern to produce the first wall (e.g., an inner wall). Concrete delivery device 136b functions similarly to concrete delivery device 136a. Concrete delivery device 136b provides concrete continuously (or intermittently) as delivery system 120 rotates about central axis 150 and translates in direction 10. In other embodiments, concrete delivery devices 136 provide concrete/material over each revolution of delivery system 120 but do not provide concrete/material as delivery system 120 translates along elongated member 110 between consecutive revolutions. Concrete delivery device 136b can thereby provide concrete in a spiral pattern to produce the second wall (e.g., an outer wall). In other embodiments, concrete delivery devices 136 provide concrete along multiple circular paths that are disposed a predetermined distance apart along central axis 150.

Structural support delivery device 130 may provide the structural support member intermittently into the concrete laid/provided by concrete delivery device 136a and concrete delivery device 136b at various angular positions of frame 122 relative to central axis 150 (e.g., every 10 degrees, every 20 degrees, every 30 degrees, etc.), according to some embodiments. Structural support delivery device 130 can provide the structural support member on top of layers of concrete provided by concrete delivery device 136a and concrete delivery device 136b via driving devices 131. Concrete delivery device 136a and concrete delivery device 136b then provide an additional layer of concrete on top of the structural support member as they pass over the structural support member during another revolution of delivery system 120.

Nozzle assembly 134 is disposed a radial distance 140 from central axis 150 along second member 128. Likewise, structural support delivery device 130 is disposed a radial distance 132 from central axis 150 along first member 126. In an exemplary embodiment, radial distance 132 and radial distance 140 are substantially equal. Likewise, a distance 143 between driving device 131a and driving device 131b may be substantially equal to distance 142 between concrete delivery device 136a and concrete delivery device 136b. Structural support delivery device 130 may be configured to translate along first member 126 such that the structural support member is provided to (or into) the top layer of the first wall and the second wall of concrete provided by concrete delivery device 136a and concrete delivery device 136b, respectively.

Distance 142 between concrete delivery device 136a and concrete delivery device 136b can be adjusted to achieve different wall thicknesses, according to an exemplary embodiment. Distance 142 can be adjusted by translating at least one of concrete delivery device 136a and concrete delivery device 136b. For example, concrete delivery device 136a can be translated radially inwards along second member 128 to increase distance 142 and thereby increase the distance between the walls (e.g., the inner and outer walls) produced by concrete delivery device 136a and concrete delivery device 136b. Likewise, concrete delivery device 136b can be translated radially outwards along second member 128 to increase distance 142 and thereby increase the distance between the inner and the outer walls produced by concrete delivery device 136a and concrete delivery device 136b, respectively.

The operation of structural support delivery device 130 may be adjusted based on distance 142 between concrete delivery device 136a and concrete delivery device 136b. For example, structural support delivery device 130 may translate along first member 126 radially inwards and radially outwards such that the structural support member is provided to both the inner wall and the outer wall produced by concrete delivery device 136a and concrete delivery device 136b. If distance 142 is increased, structural support delivery device 130 translates or provides the structural support member over a larger radial distance along first member 126. If distance 142 is decreased, structural support delivery device 130 translates or provides the structural support member over a shorter/smaller radial distance along first member 126.

In an exemplary embodiment, additive manufacturing system 100 has an overall height of 53 feet or less. This facilitates transporting additive manufacturing system 100 from job sites in a highboy type trailer. Additionally, first member 126 and second member 128 may be hingedly coupled with frame 122 such that first member 126 and second member 128 can rotate downwards to decrease the size of additive manufacturing system 100 for transportation.

Figure 21:
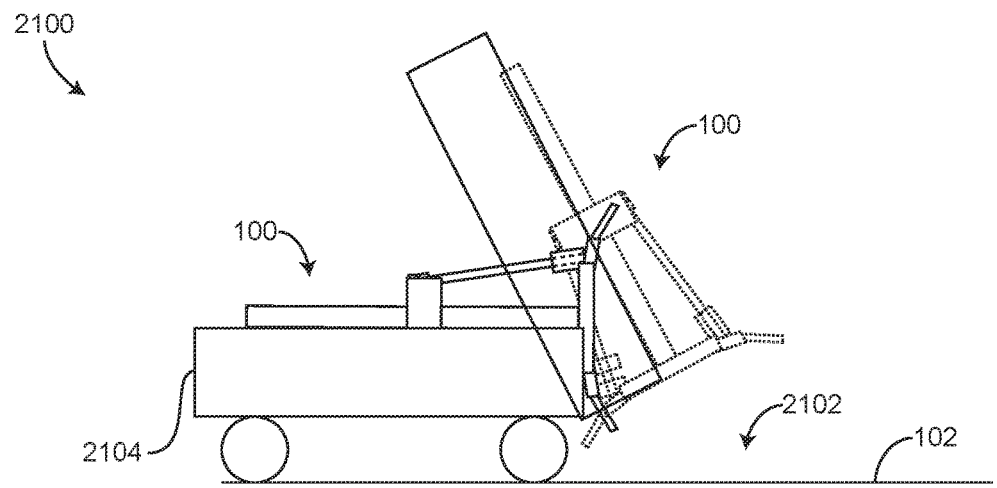
FIG. 21 is a drawing of the additive manufacturing system of FIG. 1 being provided to a jobsite by a trailer, according to an exemplary embodiment.

Referring now to FIG. 21, diagram 2100 shows additive manufacturing system 100 being installed at a job site 2102 on ground surface 102. Additive manufacturing system 100 can be transported in a trailer 2104 and provided to job site 2102. In some embodiments, additive manufacturing system 100 can be fully installed during transport and installation at job site 2102. In other embodiments, additive manufacturing system 100 is disassembled (e.g., delivery system 120 is removed from elongated member 110, elongated member 110 is removed from base assembly 104, etc.). If additive manufacturing system 100 is installed when fully or partially assembled (e.g., base assembly 104 and elongated member 110 are assembled), trailer 2104 may rotate (e.g., tilt) to provide additive manufacturing system 100 at job site 2102. Additive manufacturing system 100 can then be moved via tractive elements 180 to pinpoint a location for a center of a structure that will be produced by additive manufacturing system 100 (e.g., structure 700).

Figure 2:
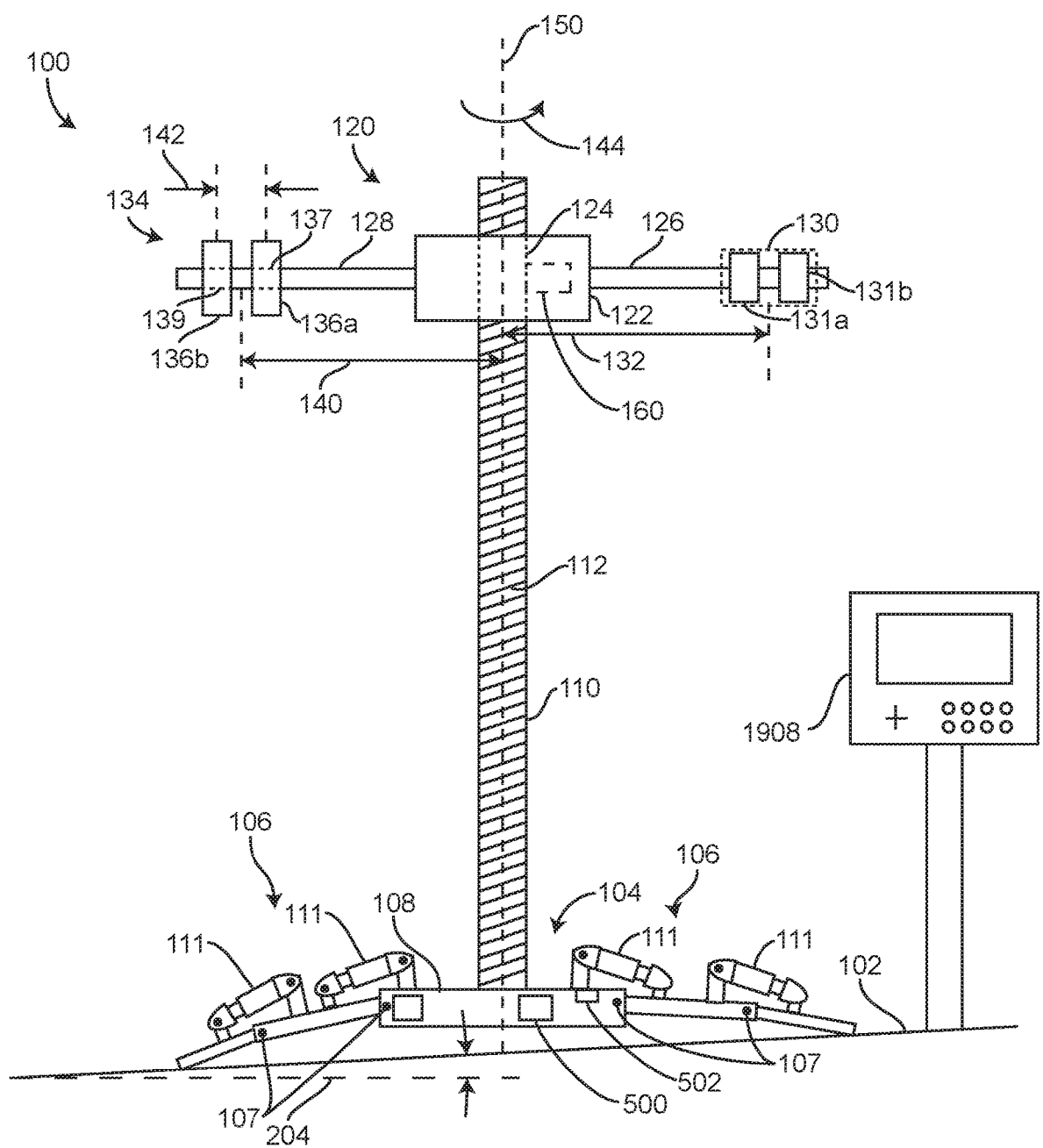
FIG. 2 is a side view of the additive manufacturing system of FIG. 1 on a sloped ground surface, according to an exemplary embodiment.

Referring now to FIG. 2, base assembly 104 can automatically level additive manufacturing system 100 in the case when ground surface 102 is angled or uneven, according to an exemplary embodiment. Additive manufacturing system 100 includes a controller 500, according to an exemplary embodiment. Controller 500 may be a single controller or represent a collection of controllers (e.g., a base assembly controller, a delivery system controller, etc.). Controller 500 can be positioned at base assembly 104 (e.g., disposed within), at frame 122, or anywhere else on additive manufacturing system 100. In other embodiments, controller 500 is disposed remotely from additive manufacturing system 100 (e.g., in an external housing) and is configured to wirelessly or wiredly communicate with the various sensors, actuators, motors, etc., of additive manufacturing system 100.

Base assembly 104 includes an orientation sensor 502 (e.g., a gyroscope), according to an exemplary embodiment. Orientation sensor 502 may be positioned at base member 108, frame 122, first member 126, second member 128, etc. Controller 500 is configured to receive orientation information of additive manufacturing system 100 from orientation sensor 502 and adjust articulation or extension of support member 106 to automatically level additive manufacturing system 100. Levelling additive manufacturing system 100 includes articulating or extending support members 106 such that central axis 150 is substantially perpendicular to a horizontal axis 204. Additive manufacturing system 100 can be leveled by articulation and/or extension of support members 106 to achieve central axis 150 extending substantially vertically, regardless of pitch, slope, or unevenness of ground surface 102 in any direction.

If support members 106 are articulable and include a double action cylinder (e.g., hydraulic cylinder 111), controller 500 can extend or retract the double action cylinder such that additive manufacturing system 100 is automatically leveled. Controller 500 may use sensory information from orientation sensor 502 as feedback information and perform feedback control (e.g., PI control, PID control, etc.) until additive manufacturing system 100 is levelled along various axes (e.g., along a horizontal axis, a longitudinal axis, etc.).

If support members 106 are configured to be articulated by hydraulic cylinder 111, base assembly 104 includes a hydraulic circuit (e.g., one or more pumps, one or more hydraulic fluid reservoirs, etc.), and all necessary plumbing components to extend/retract hydraulic cylinders 111 to level additive manufacturing system 100.

Frame 122 includes a motor, roller, engine, etc., shown as primary mover 160. Primary mover 160 is configured to drive delivery system 120 such that delivery system 120 rotates about central axis 150 relative to elongated member 110. The operation of primary mover 160 can be controlled by controller 500 (e.g., the speed, direction, etc.).

Figure 4:
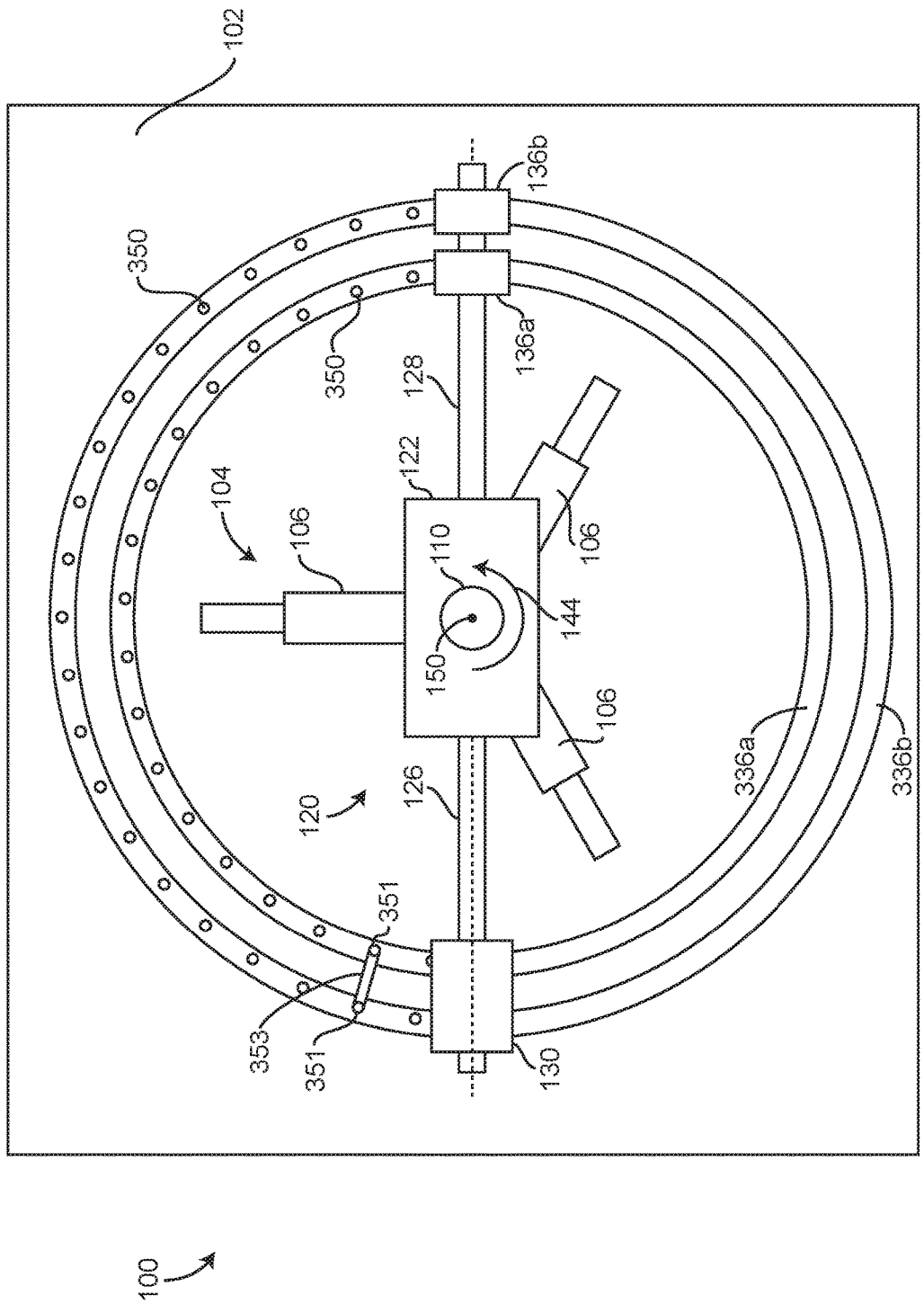
FIG. 4 is a top view of the additive manufacturing system of FIG. 3 after performing one or more revolutions to lay one or more layers of material and partially install a structural support member, according to an exemplary embodiment.
Figure 5:
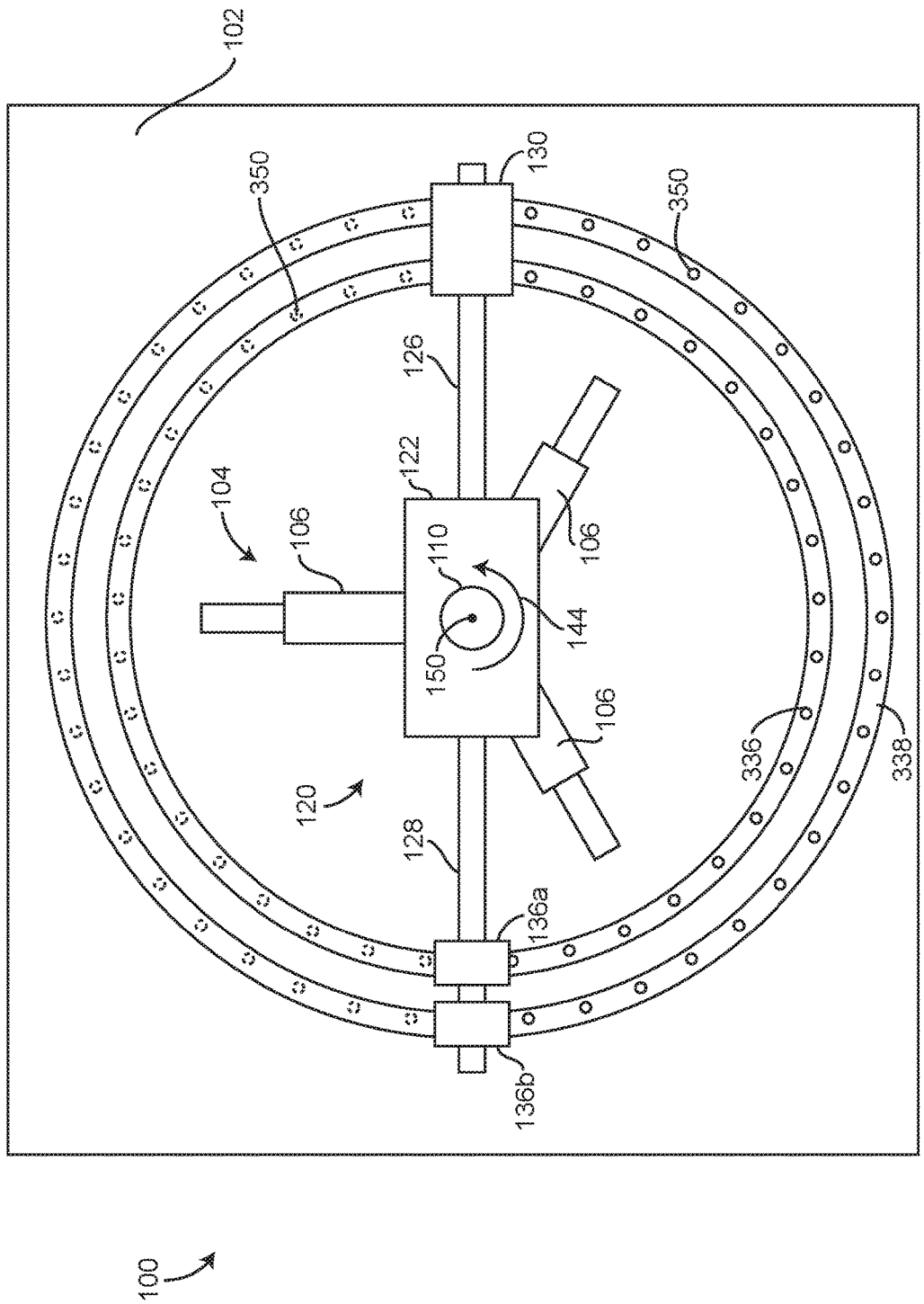
FIG. 5 is a top view of the additive manufacturing system of FIG. 4 after an additional half revolution and installing additional structural support members, according to an exemplary embodiment.

Referring now to FIGS. 3-5, the operation of additive manufacturing system 100 is shown in greater detail, according to an exemplary embodiment. FIG. 3 shows the case when additive manufacturing system 100 has laid concrete for half of a first layer. Concrete delivery device 136*a* provides track 336*a* of material and track 336*b* of material (e.g., concrete). Since each revolution is 360 degrees, at 180 degrees (as shown in FIG. 3), half of the first layer of material has been laid.

FIG. 3 to FIG. 4 represents when delivery system 120 has completed a predetermined number of revolutions about central axis 150 in direction 144 and provided some amount of layers of concrete/material. Structural support delivery device 130 provides structural support member 350 into and/or between track 336*a* and track 336*b* of material. Structural support member 350 that is provided by structural support delivery device 130 and/or driving devices 131 can include a vertical component 351 and/or a horizontal component 353. Vertical component 351 extends into tracks 336. Vertical components 351 may be driven downwards into the layers of material/concrete of tracks 336. Horizontal component 353 extends between tracks 336 and can be integrally formed or connected with vertical components 351. Horizontal component 353 may extend between vertical components 351. Horizontal component 353 can be provided to or into the top surface of tracks 336.

FIG. 4 to FIG. 5 represents when delivery system 120 has rotated another 180 degrees about central axis 150 in direction 144 to complete half of another revolution and lay half of a second layer of material. As delivery system 120 rotates another 180 degrees to complete half of another revolution, concrete delivery device 136*a* and concrete delivery device 136*b* provide an additional layer of concrete over the top of structural support members 350. Likewise, structural support delivery device 130 provides structural support member 350 to the top of the other half of the first layer of concrete of track 336*a* and track 336*b* provided by concrete delivery device 136*a* and concrete delivery device 136*b*, respectively. Additive manufacturing system 100 can continue providing the concrete along track 336*a* and track 336*b*, with each revolution laying another layer of concrete and structural support member 350 on top of the concrete. In this way, structural support members 350 can be "sandwiched" between consecutive layers of concrete/material. Structural support member 350 provides structural support for the structure produced by additive manufacturing system 100. Specifically, structural support member 350 provides structural support/strength between track 336*a* and track 336*b* and/or between layers of material/concrete provided by concrete delivery devices 136.

Structural support delivery device 130 can be configured to provide structural support members 350 at various angular positions as delivery system 120 rotates. For example, structural support delivery device 130 may provide structural support members 350 every 10 degrees, every 20 degrees, etc. In some embodiments, the angular positions at which structural support delivery device 130 provides structural support members 350 depends on a radial position of structural support delivery device 130 relative to central axis 150. For example, if a structure having a larger radius is being produced by additive manufacturing system 100, the angular positions at which structural support members 350 are provided to tracks 336 may be less than for a structure having a smaller radius. In some embodiments, structural support members 350 are provided after structural support delivery device 130 travels a predetermined arc length (e.g., 10 inches).

Figure 22:
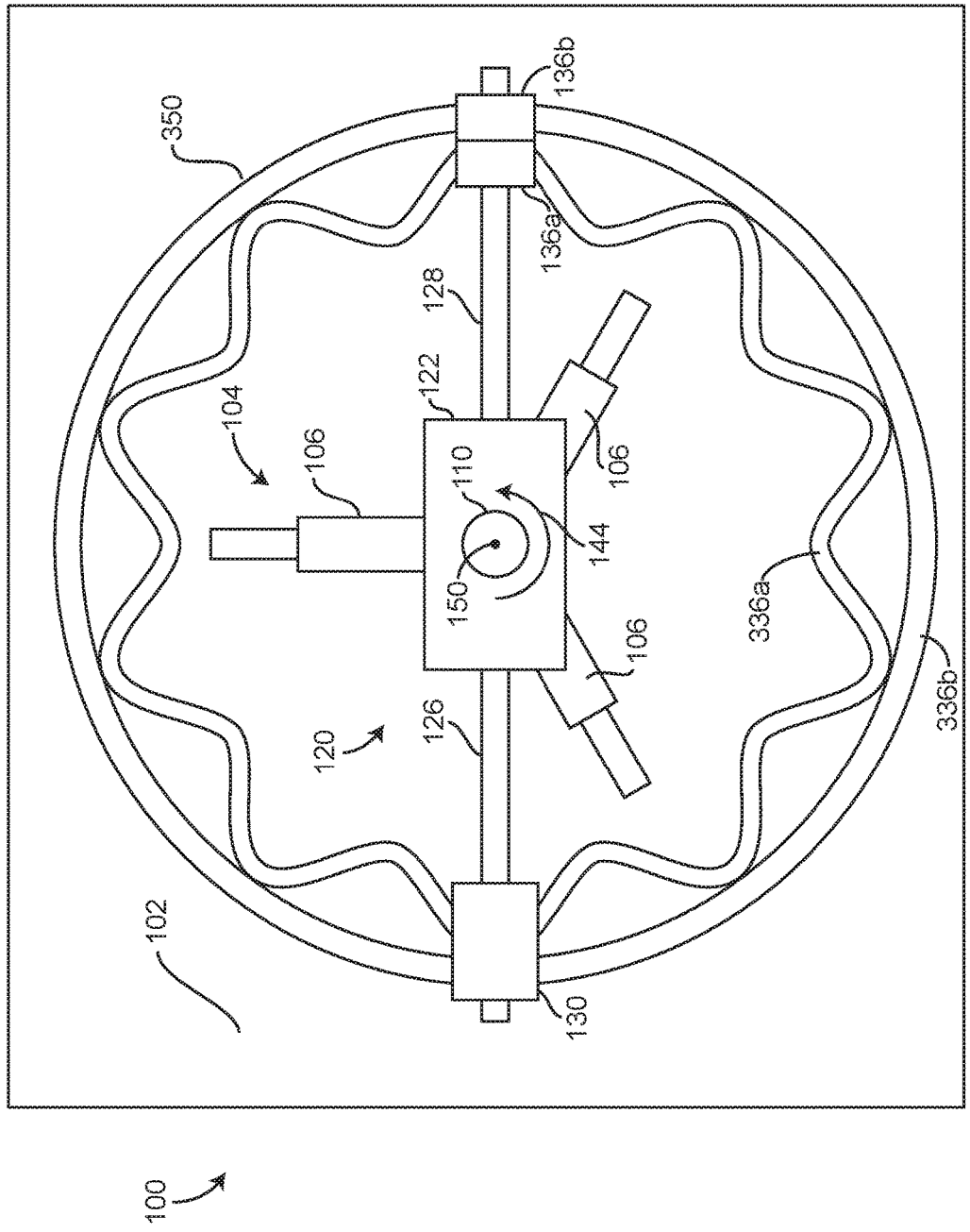
FIG. 22 is a top view of the additive manufacturing system of FIG. 1, with one of the printing heads following a zig-zag/sinusoidal path at a first position, according to an exemplary embodiment.

In some embodiments, one of concrete delivery devices 136*a*-*b* translates along second member 128 as delivery system 120 rotates/revolves (as shown in FIG. 22). For example, concrete delivery device 136*a* (e.g., an inner concrete delivery device 136) may actuate between a first radial and a second radial position along second member 128 to produce a zig-zag or sinusoidal pattern.

Figure 23:
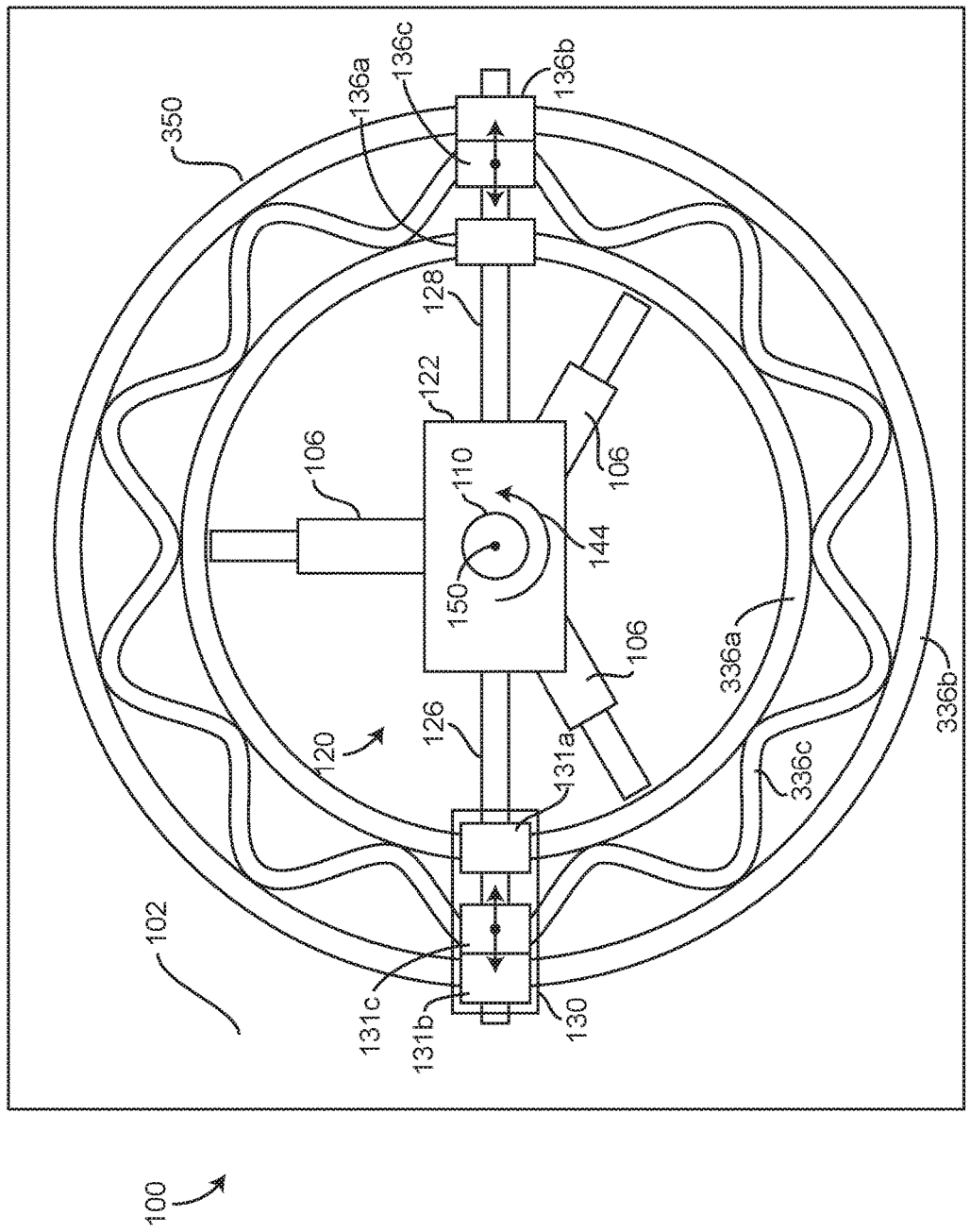
FIG. 23 is a top view of the additive manufacturing system of FIG. 1, with one of the printing heads following a zig-zag/sinusoidal path at a second position, according to an exemplary embodiment.

Referring now to FIG. 23, several concrete delivery devices 136 can be used. Concrete delivery device 136*a* and concrete delivery device 136*b* may maintain constant radial distances from central axis 150 to print/provide material/concrete to form track 336*a* and track 336*b* (and walls as production of the structure progresses and additional layers are added). Concrete delivery device 136*c* can translate between various radial distances relative to central axis 150 to produce a zig-zag or sinusoidal shaped track 336*c*. Concrete delivery device 136*c* may be constrained to actuate between concrete delivery device 136*a* and concrete delivery device 136*b* as delivery system 120 rotates. Concrete delivery device 136*c* can increase and decrease in its radial distance from central axis 150 linearly, non-linearly, etc. For example, concrete delivery device 136*c* may lay concrete in a saw tooth or zig-zag pattern (if concrete delivery device 136*c* translates linearly) or in a sinusoidal pattern (if concrete delivery device 136*c* translates non-linearly). In some embodiments, concrete delivery device 136 reciprocatingly translates between concrete delivery device 136*a* and concrete delivery device 136*b*.

It should be understood that while various embodiments having two or three concrete delivery devices 136 are shown, any number of concrete delivery devices 136 may be used to print any number of walls. Some of the concrete delivery devices 136 may be at a fixed radial distance relative to central axis 150, while other concrete delivery devices 136 can translate along second member 128 as delivery system 120 rotates. Additionally, any of the patterns that concrete delivery devices 136 may be configured to print can be combined with a constant rotating/translating delivery system 120 (e.g., if elongated member 110 and frame 122 are threadingly coupled) or with an intermitted rotating/translating delivery system 120 (e.g., a delivery system 120 that translates along elongated member 110 between consecutive rotations).

Figure 6:
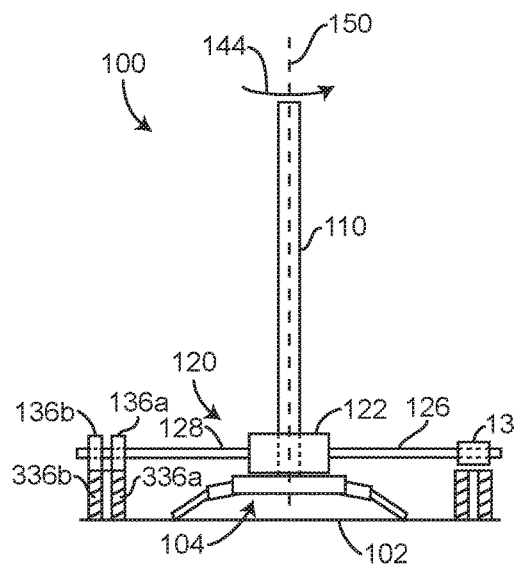
FIG. 6 is a side view of the additive manufacturing system of FIG. 1 at a first stage of producing a structure, according to an exemplary embodiment.
Figure 7:
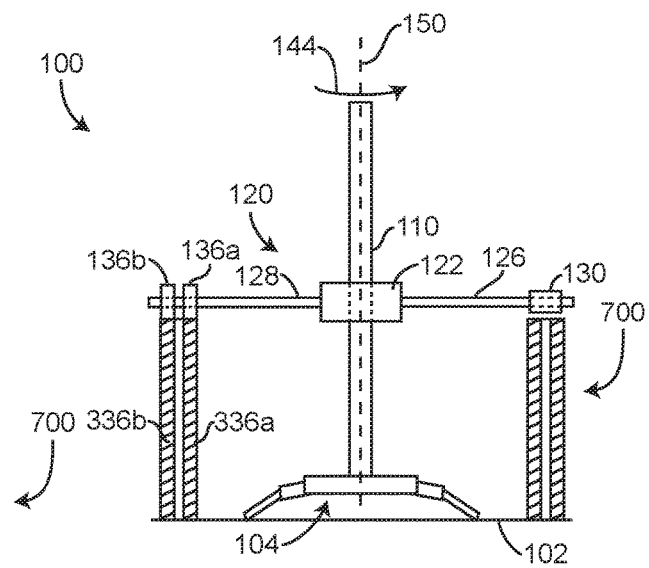
FIG. 7 is a side view of the additive manufacturing system of FIG. 1 at a second stage of producing a structure, according to an exemplary embodiment.
Figure 8:
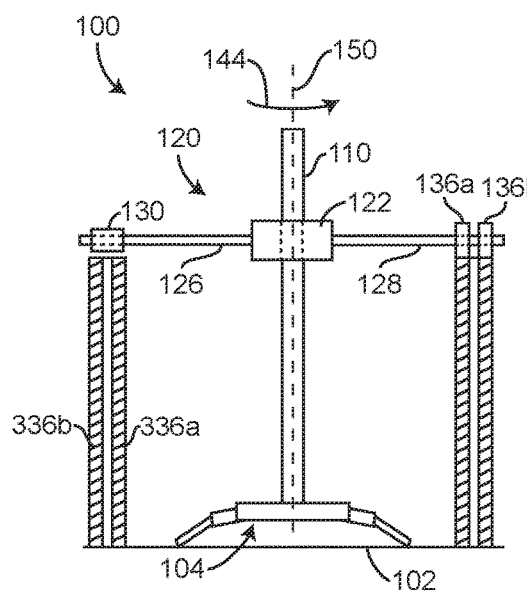
FIG. 8 is a side view of the additive manufacturing system of FIG. 1 at a third stage of producing a structure, according to an exemplary embodiment.
Figure 9:
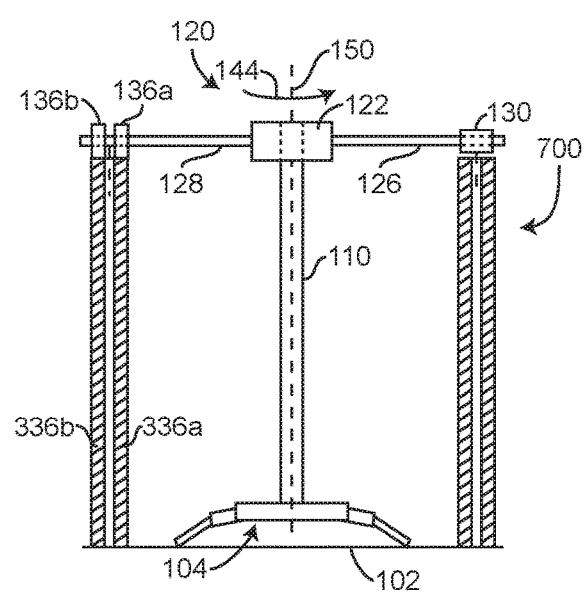
FIG. 9 is a side view of the additive manufacturing system of FIG. 1 at a fourth stage of producing a structure, according to an exemplary embodiment.

Referring now to FIGS. 6-9, additive manufacturing system 100 is shown producing a structure 700. Delivery system 120 rotates about central axis 150 and provides the material via concrete delivery device 136*a* and concrete delivery device 136*b*. Structural support member 350 is provided to the top layer of concrete. Structural support member 350 and concrete may be provided continuously as delivery system 120 rotates about central axis 150 and translates upwards along elongated member 110. FIG. 6 shows additive manufacturing system 100 at a beginning of producing structure 700. FIG. 7 shows additive manufacturing system 100 at a midpoint of producing structure 700. FIG. 8 shows additive manufacturing system 100 near completion of producing structure 700. FIG. 9 shows additive manufacturing system 100 at a completion of structure 700. As shown in FIGS. 6-9, delivery system 120 translates upwards along elongated member 110 throughout production of structure 700. Additive manufacturing system 100 can produce a cylindrical structure with double walls (or triple walls if three concrete delivery devices 136/138 are used) having a height substantially equal to longitudinal length 114 of elongated member 110. Specifically, additive manufacturing system 100 can produce a cylindrical structure with double walls having a height substantially equal to a maximum height that delivery system 120 can translate along elongated member 110 relative to ground surface 102.

Advantageously, additive manufacturing system 100 automatically produces structure 700. Structure 700 may be any of a silo, a tower, a concrete pipe, etc., or any other generally cylindrical structure. Additive manufacturing system 100 can automatically produce or print wind towers for a wind energy field. Additive manufacturing system 100 can produce each wind tower with a different geometry to maximize or improve an efficiency of power generation for the wind energy field as a whole. For example, each individual wind tower may be printed or produced to maximize aerodynamics and wind flow so that towers behind them receive a higher, cleaner wind velocity/flow. This may propagate through the wind energy field as a whole so that towers most rearward achieve the most benefits from the overall optimization of air flow through the field. In this way, structures 700 that are produced by additive manufacturing system 700 may be produced with different geometry based on a future location relative to other structure 700 that are produced by additive manufacturing system 700.

Referring now to FIGS. 15-17, additional elongated members 110 can be installed to produce taller structures 700. Additional elongated members 110 can be configured to threadingly couple with each other to achieve an overall elongated member 110 that is taller, as shown in FIG. 16. In other embodiments, additional elongated members 110 are coupled (e.g., press fit, slip fit, etc., with each other to produce a taller overall elongated member 110. In other embodiments (as shown in FIG. 17), elongated member 110 can be completely removed from base assembly 104 and replaced with a taller elongated member 110. Advantageously, this facilitates producing structure 700 of any height. Additionally, radial distance 140 and radial distance 132 can be adjusted to produce structures 700 having any diameter/radius. In some embodiments, first member 126 and second member 128 are removably coupled with frame 122 such that longer first members 126 and second members 128 can be installed, thereby facilitating production of structures 700 having any diameter. In this way, structures 700 that are generally cylindrical can be produced having any height or diameter. Additional elongated member 110 can be installed to the top of elongated members 110 that are directly below after delivery system 120 reaches a maximum height of the elongated member(s) 110. For example, after delivery system 120 reaches a maximum height of a first elongated member 110 and has produced structure 700 at the maximum height, a second elongated member 110 can be installed at the top of the first elongated member 110, and additive manufacturing system 100 can resume printing concrete/material.

Referring now to FIG. 14, structure 700 produced by additive manufacturing system 100 has inner wall 1210 and outer wall 1208, according to an exemplary embodiment. Inner wall 1210 is produced by the layers of track 336a. Outer wall 1208 is produced by the layers of track 336b. Structural support member 350 extends between inner wall 1210 and outer wall 1208. Inner wall 1210 and outer wall 1208 define a volume 1212 therebetween. Concrete 1406 can be poured into volume 1212 between inner wall 1210 and outer wall 1208 to substantially fill volume 1212. Concrete 1406 may be poured or provided to volume 1212 via a nozzle, concrete delivery device, etc., shown as spout 1404. Spout 1404 may be fluidly coupled with a concrete reservoir 1408 that contains concrete 1406 therewithin.

Referring now to FIG. 11, a diagram 1100 shows a path 1102 that concrete delivery device 136a (or any of concrete delivery devices 136) follows over the production of structure 700, according to an exemplary embodiment. Path 1102 has a generally spiral pattern. Path 1102 has a radius 1106. Radius 1106 may be a radial distance between central axis 150 and concrete delivery device 136a or concrete delivery device 136b (or any other concrete delivery device 136). Each revolution of delivery system 120 causes delivery system 120 to translate a distance 1104 along central axis 150 (e.g., in the upwards direction). Layers of concrete provided by concrete delivery device 136a or concrete delivery device 136b have a height substantially equal to distance 1104. The concrete is deposited (e.g., laid) at space 1108 between path 1102 of consecutive revolutions of delivery system 120.

Referring now to FIG. 12, diagram 1200 shows another path 1202 that any of concrete delivery devices 136 may follow over the production of structure 700, according to another exemplary embodiment. Path 1202 is formed by circular paths over which any of concrete delivery devices 136 may sweep during each revolution of delivery system 120. Points 1204 represent when a full revolution of delivery system 120 has been completed (and therefore concrete delivery device 136 has swept along the circular path). After concrete delivery device 136 sweeps a circular path, concrete delivery device 136 translates upwards a distance 1206 in a direction parallel with central axis 150 due to the translation of delivery system 120. In some embodiments, distance 1206 is the same as distance 1104. Concrete delivery device 136 can be configured/operated to provide concrete while sweeping along the circular paths. In some embodiments, concrete delivery device 136 does not provide concrete as it translates upwards distance 1206. Each circular path corresponds to another layer of material/concrete printed by concrete delivery device 136. The structural support member (e.g., structural support member 350) can be provided after concrete delivery device 136 has moved distance 1206 in the direction parallel to central axis 150 a predetermined number of times (e.g., after a predetermined number of layers of material/concrete have been printed). In other embodiments, the structural support member is provided while concrete delivery device 136 sweeps along one of the circular paths. In other embodiments, the structural support member is provided while concrete delivery device 136 sweeps along one of the circular paths but does not print concrete (e.g., if delivery system 120 is configured to rotate to provide structural support member 350 but not print concrete/material). In some embodiments, the structural support member is provided to (e.g., into, across, etc.) every layer of material printed by concrete delivery device 136 (e.g., for every one of the circular paths).

Referring to FIG. 13, diagram 1300 shows another path 1302 that concrete delivery devices 136 may follow. Path 1302 of FIG. 13 is similar to path 1202 of FIG. 12, but has a sinusoidal or zig-zag pattern. This can be produced by translating one of concrete delivery devices 136 along second member 128 as delivery system 120 rotates.

Figure 10:
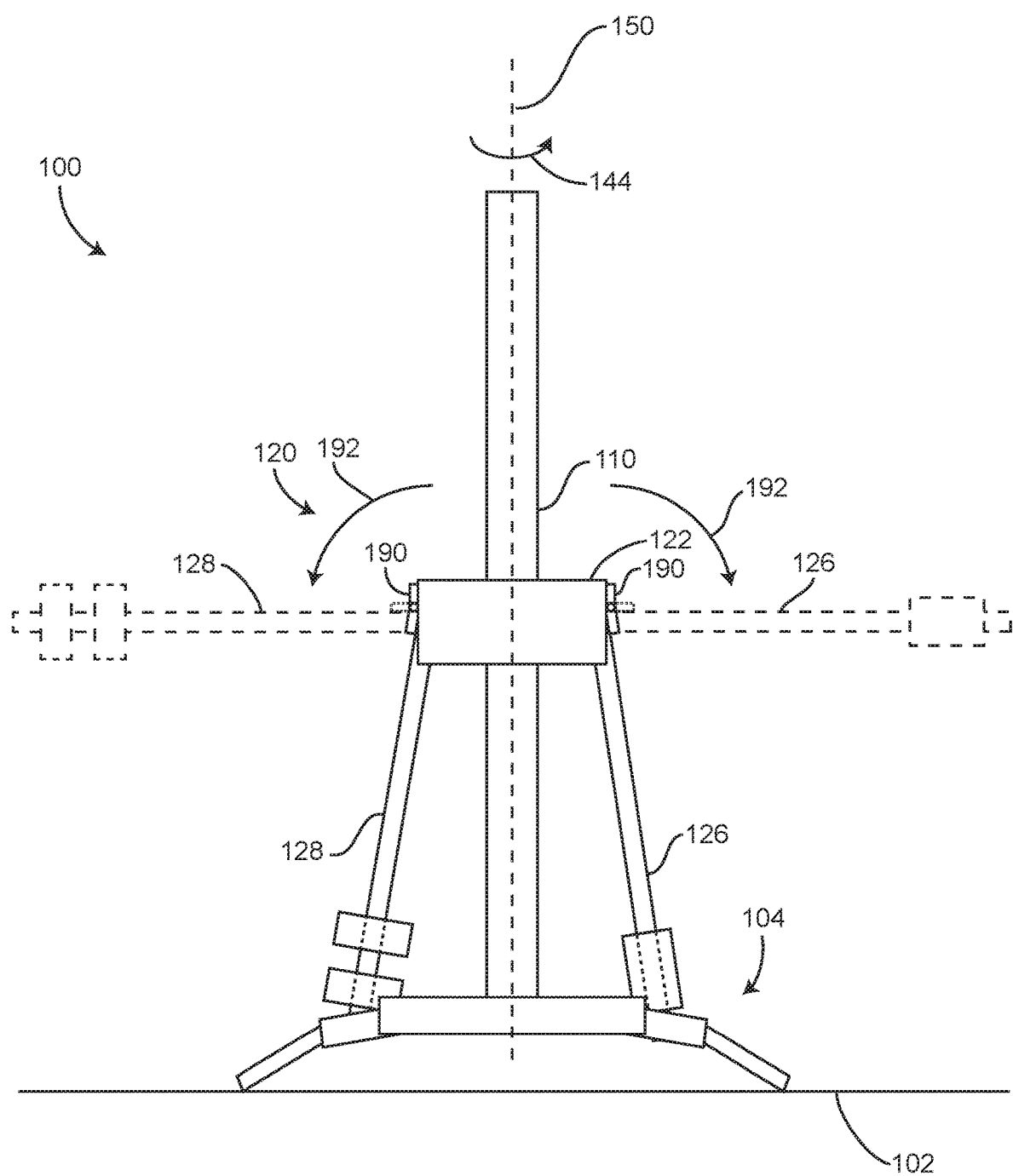
FIG. 10 is a side view of the additive manufacturing system of FIG. 1, having foldable/hinged arms, according to an exemplary embodiment.

Referring now to FIG. 10, additive manufacturing system 100 is shown in a configuration for transportation, according to an exemplary embodiment. First member 126 and second member 128 can be hingedly coupled with frame 122 via hinges 190. Hinges 190 may be any type of hinge or coupler configured to facilitate rotation of first member 126 and second member 128 in directions 192 (e.g., downwards).

Advantageously, this reduces the overall size of additive manufacturing system 100 and facilitates transportation of additive manufacturing system 100.

Figure 18:
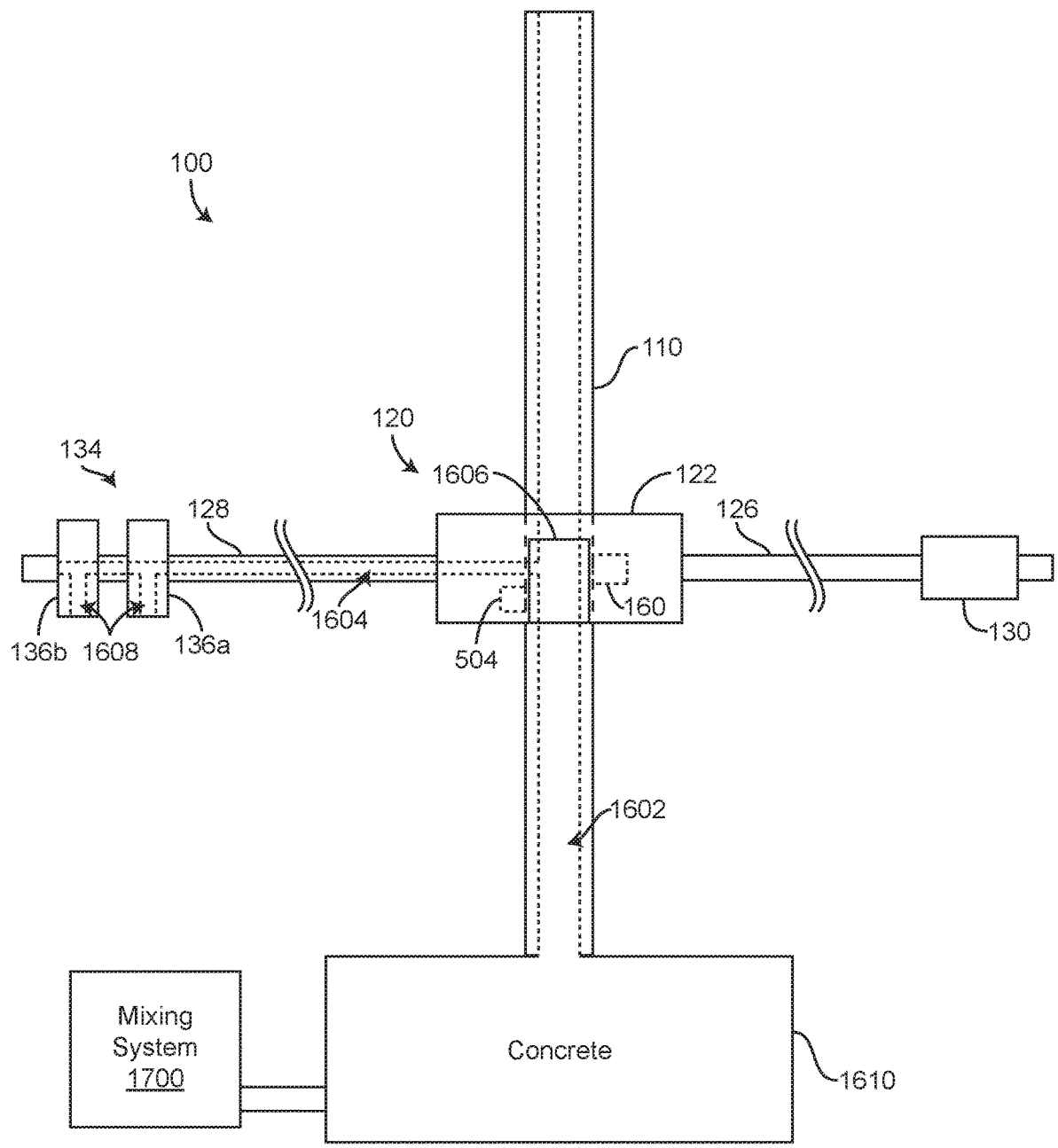
FIG. 18 is a side sectional view of the additive manufacturing system of FIG. 1, showing various passageways and inner volumes of one or more members of the additive manufacturing system that material can be transferred through, according to an exemplary embodiment.

Referring now to FIG. 18, frame 122 includes a rotary union 1606, according to an exemplary embodiment. Elongated member 110 includes an inner volume, a hollow portion, a passageway, a cavity, a channel, a piping system, etc., shown as inner volume 1602. Inner volume 1602 may extend along substantially an entire height of elongated member 110. Inner volume 1602 is configured to facilitate the transport of material (e.g., concrete) therethrough elongated member 110. Inner volume 1602 may be fluidly coupled with a passageway, inner volume, piping system, cavity, hollow portion, etc., of second member 128, shown as inner volume 1604 and a storage container, a reservoir, a tank, a mixer drum, etc., shown as material reservoir 1610. Inner volume 1604 of second member 128 is configured to facilitate the transport of concrete from inner volume 1602 to concrete delivery device 136a and concrete delivery device 136b. Additive manufacturing system 100 can also include a mixing system 1700 that is configured to receive one or more ingredients and provide the material (e.g., concrete) to material reservoir 1610 for storage and for transport to concrete delivery devices 136. In some embodiments, mixing system 1700 includes a mixing apparatus (e.g., a dry mixer) and a motor or primary mover (e.g., an internal combustion engine) that is configured to mix the various ingredients to produce the material. The material can then be transferred to material reservoir 1610.

Inner volume 1604 and inner volume 1602 may be fluidly coupled with each other via rotary union 1606. Rotary union 1606 is configured to maintain fluid connection between inner volume 1602 and inner volume 1604 despite the angular position of delivery system 120 about central axis 150. In this way, concrete can be continuously provided to concrete delivery device 136a and concrete delivery device 136b.

Concrete delivery device 136a and concrete delivery device 136b each include a supply passageway, a hollow portion, a channel, an inner volume, etc., shown as inner volume 1608. Inner volume 1608 is fluidly coupled with inner volume 1604 of second member 128. Inner volume 1608 facilitates the passage of concrete therethrough and facilitates dispensing/laying/pouring of concrete via concrete delivery device 136a and concrete delivery device 136b. In some embodiments, concrete delivery device 136a and concrete delivery device 136b include nozzles (e.g., a diverging nozzle, a converging nozzle, etc.), disposed at the outlet of inner volume 1608. The nozzle can be configured to direct concrete as it egresses concrete delivery device 136a and concrete delivery device 136b. In other embodiments, concrete delivery device 136a and concrete delivery device 136b include a storage tank, capsule, tank, box, container, etc., configured to contain concrete therewithin. Concrete delivery device 136a and concrete delivery device 136b can provide the concrete contained within the container associated therewith to provide the concrete for construction of structure 700. In some embodiments, the container can be replenished (e.g., re-filled) via inner volume 1602 and inner volume 1604.

Figure 24:
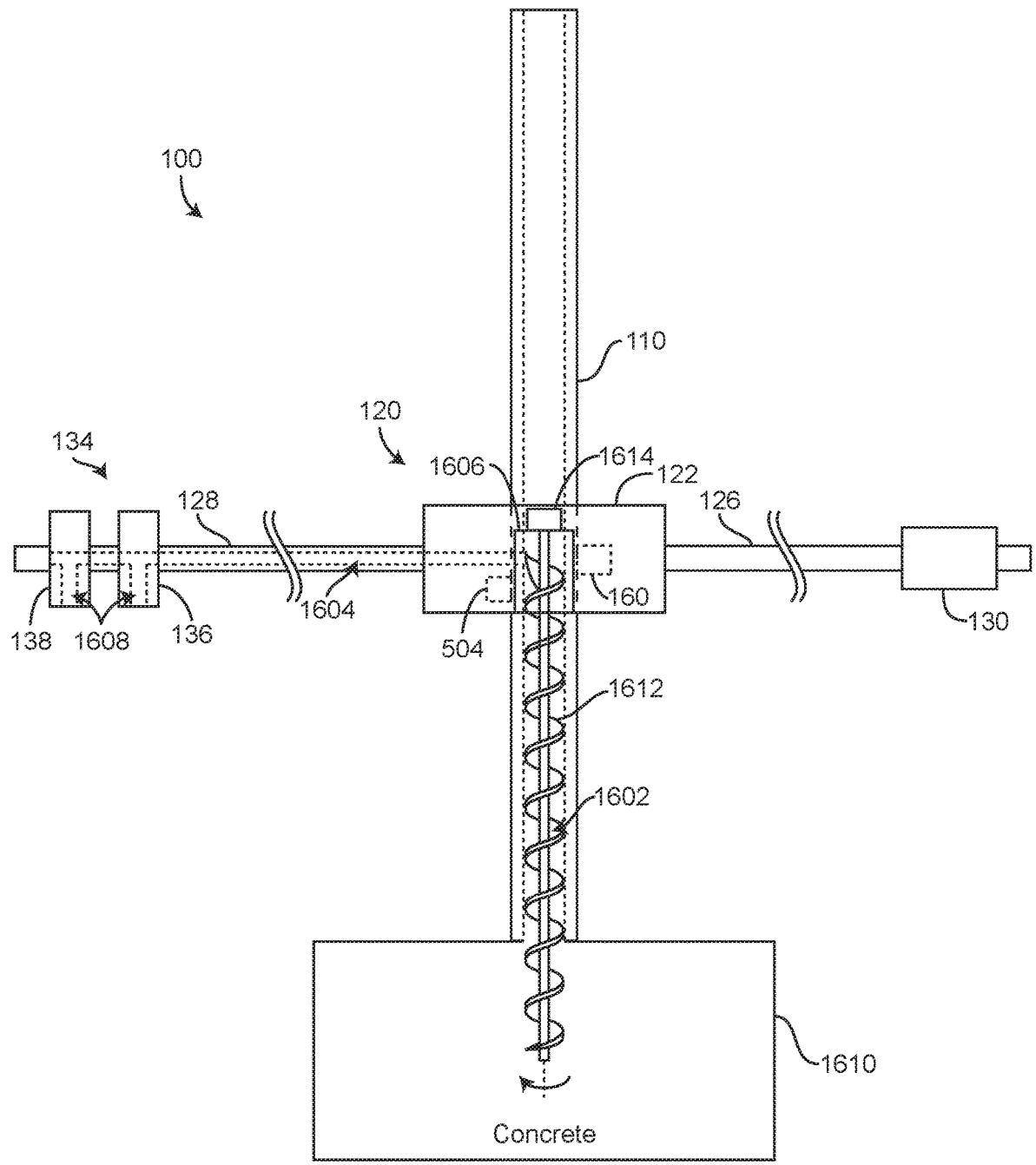
FIG. 24 is a side sectional view of the additive manufacturing system of FIG. 18, including an auger disposed within the central column.

In some embodiments, elongated member 110 includes a moving device (e.g., a conveyor, an auger 1612 as shown in FIG. 24, etc.) disposed within inner volume 1602 configured to transport concrete 1406 to concrete delivery device 136a and concrete delivery device 136b (or to the containers associated with each or both of concrete delivery device 136a and concrete delivery device 136b). The moving device (e.g., an auger) can be driven by primary mover 160 or by another primary mover, engine, electric motor, etc., shown as auger motor 1614. In other embodiments, another primary mover is disposed either at frame 122, or at the top of elongated member 110, or at base assembly 104, and is configured to drive the moving device. The moving device of elongated member 110 can be operated by controller 500. Likewise, primary mover 160 can be operated by controller 500. Auger 1612 may be operated to draw material from material reservoir 1610 and facilitates the transport of the material from material reservoir 1610, through inner volume 1602, rotary union 1606, and inner volume 1604 to concrete delivery devices 136.

In some embodiments, concrete delivery device 136a and concrete delivery device 136b include a dispensing device (e.g., an auger) that extends at least partially through inner volume 1608 and is configured to dispense concrete therethrough. Concrete delivery device 136a and concrete delivery device 136b can each include a motor, hydraulic system, engine, etc., or more generally, a primary mover configured to drive the dispensing device. For example, if the dispensing device is an auger, the primary mover can be rotatably coupled with the auger via a driveshaft or via a power train system (e.g., belts, gears, chains, etc.) to drive the auger. The dispensing device facilitates accurately dispensing concrete via concrete delivery device 136a and concrete delivery device 136b. In some embodiments, the dispensing device is operated by controller 500.

In other embodiments, separate passageways extend upwards through elongated member 110 and are fluidly coupled with a hopper of each or one or more of concrete delivery devices 136. Water (or more generally, wet ingredients of the material/concrete) and cement (or more generally, dry ingredients of the material/concrete) can be provided to the hopper(s) (e.g., via the one or more separate passageways). The water and/or the cement may be provided to the hopper(s) via a pumping system, a conveyor system, etc. In some embodiments, the cement is aerated before being provided to the hopper(s) to facilitate the transport of the cement/dry ingredients. The hopper(s) can each include a mixing auger and can mix the wet and the dry ingredients to form the material/concrete. The hopper(s) may be fluidly coupled with concrete delivery devices 136 and provide concrete delivery devices 136 with the mixed concrete/material.

Figure 25:
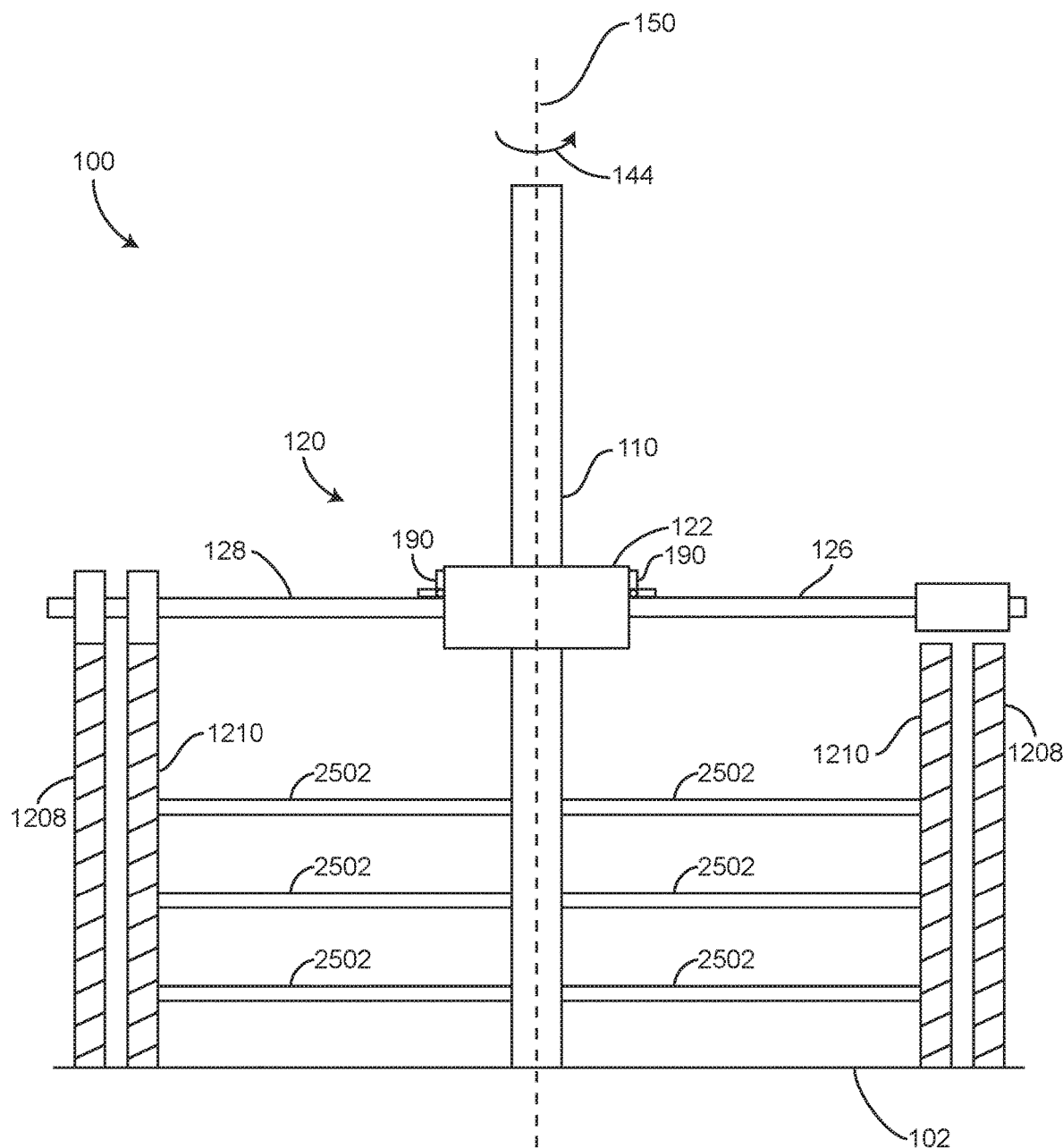
FIG. 25 is a side sectional view of the additive manufacturing system of FIG. 1, with the central column integrated as a structural component of a structure being produced by the additive manufacturing system, and support members extending between the central column and one of the walls of the structure, according to an exemplary embodiment.
Figure 26:
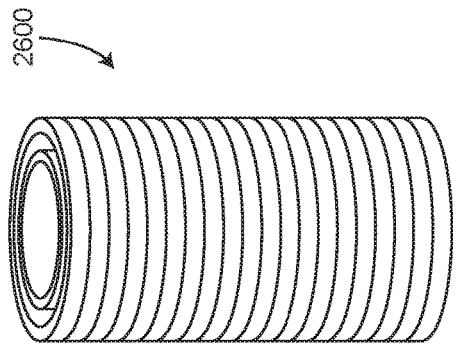
FIG. 26 is a perspective view of a first structure that can be produced by the additive manufacturing system of FIG. 1, according to an exemplary embodiment.
Figure 27:
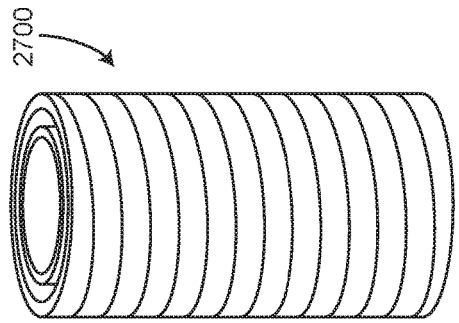
FIG. 27 is a perspective view of a second structure that can be produced by the additive manufacturing system of FIG. 1, according to an exemplary embodiment.
Figure 28:
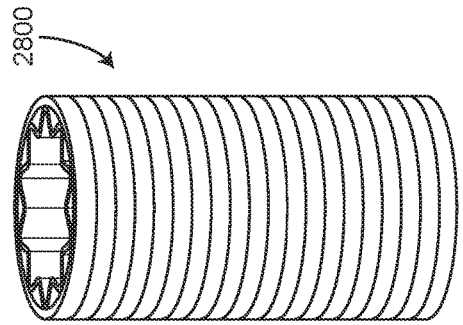
FIG. 28 is a perspective view of a third structure that can be produced by the additive manufacturing system of FIG. 1, according to an exemplary embodiment.
Figure 29:
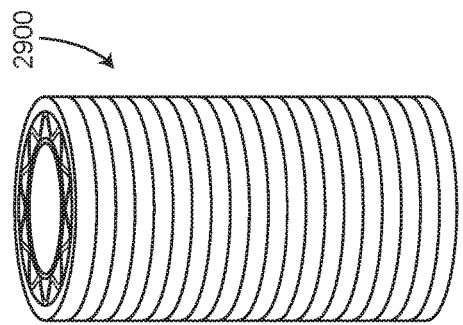
FIG. 29 is a perspective view of a structure that can be produced by the additive manufacturing system of FIG. 1, according to an exemplary embodiment.
Figure 30:
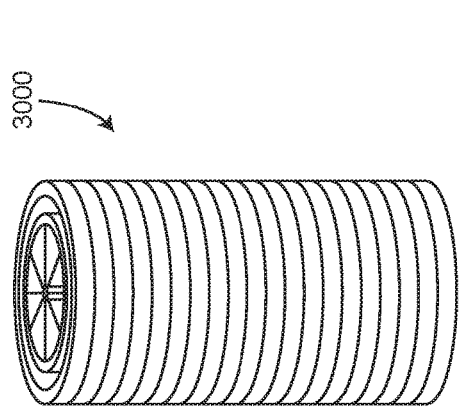
FIG. 30 is a perspective view of another structure that can be produced by the additive manufacturing system of FIG. 1, according to an exemplary embodiment.
Figure 31:
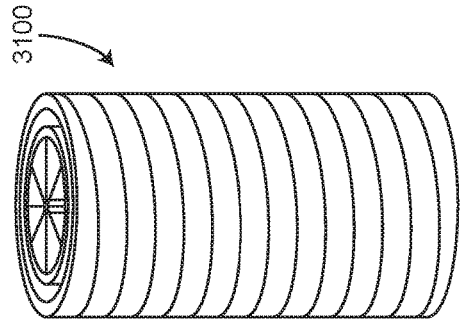
FIG. 31 is a perspective view of another structure that can be produced by the additive manufacturing system of FIG. 1, according to an exemplary embodiment.
Figure 32:
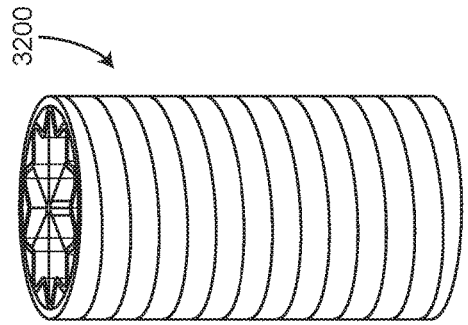
FIG. 32 is a perspective view of another structure that can be produced by the additive manufacturing system of FIG. 1, according to an exemplary embodiment.
Figure 33:
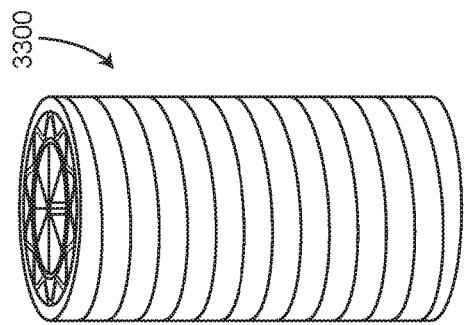
FIG. 33 is a perspective view of another structure that can be produced by the additive manufacturing system of FIG. 1, according to an exemplary embodiment.

Referring now to FIG. 25, elongated member 110 can be integrated into structure 700 as a support member. Elongated member 110 can be installed into ground surface 102. Delivery system 120 can then be installed onto elongated member 110. As delivery system 120 prints layers of concrete to form walls 1208 and 1210, structural support members 2502 can be installed between elongated member 110 and one or more of walls 1208 and 1210. Structural support members 2502 (e.g., beams, bars, pipes, cylinders, metal components, rebar, etc.) can be installed as structure 700 is produced. Structural support members 2502 can be spaced apart a distance along central axis 150. After structure 700 is completed, delivery system 120 can be removed from the top end of elongated member 110, and elongated member 110 may remain as a central support column of structure 700. In some embodiments, structural support member 2502 are installed even if additive manufacturing system 100 is movable (e.g., includes tractive elements 180). Structural support members 2502 can be used when additive manufacturing system 100 is producing tall structures, to provide additional structural support to elongated member 110 to reduce tipping of elongated member 110.

Figure 19:
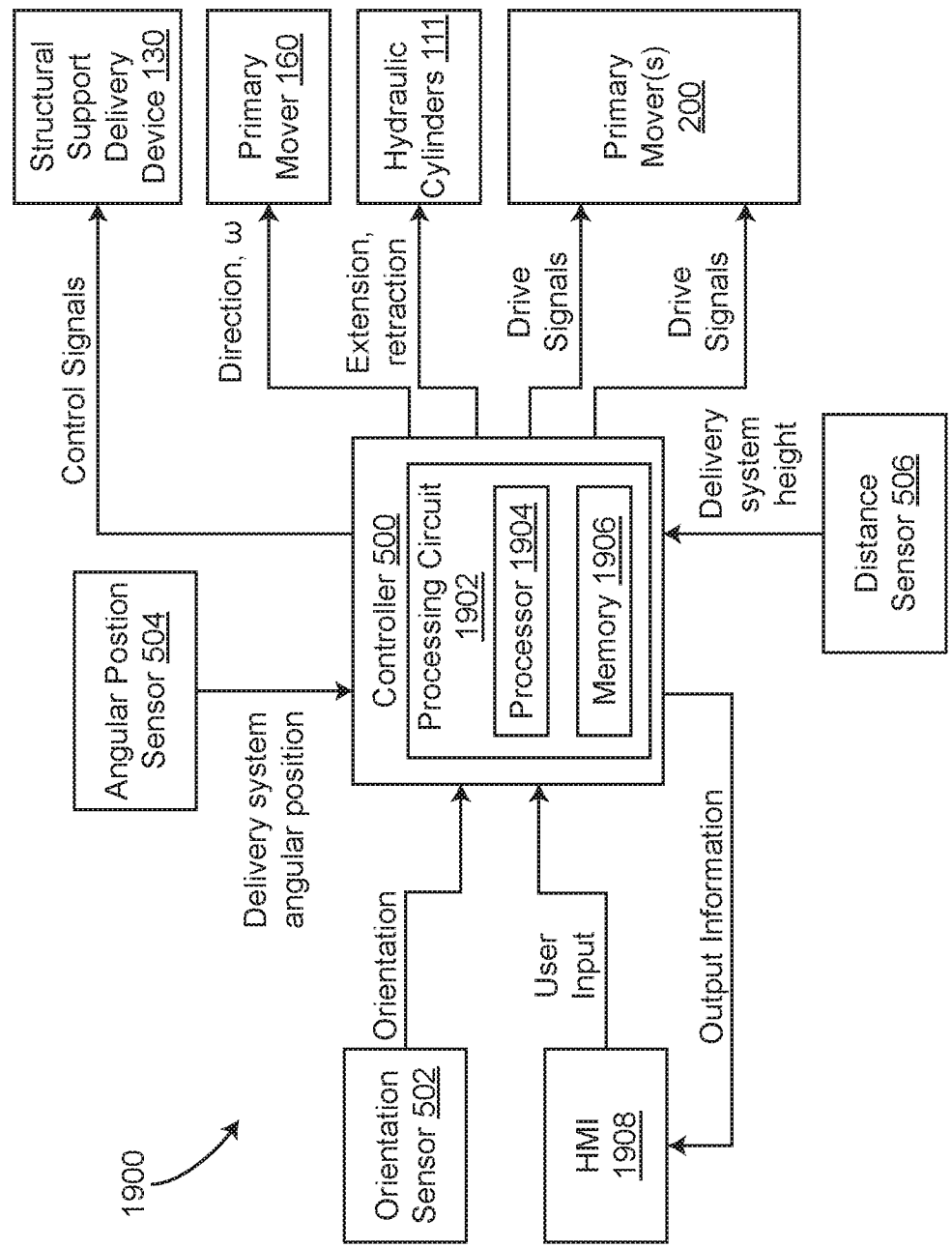
FIG. 19 is a block diagram of a control system that can be used to operate the additive manufacturing system of FIG. 1, according to an exemplary embodiment.

Referring now to FIG. 19, a block diagram of a control system 1900 for additive manufacturing system 100 is shown, according to an exemplary embodiment. Control system 1900 is configured to operate any of the various primary movers, devices, etc., of additive manufacturing system 100. Control system 1900 includes controller 500. Controller 500 may be positioned at base assembly 104 of additive manufacturing system 100, at frame 122 of additive manufacturing system 100, etc., or in any other location on additive manufacturing system 100. In other embodiments, controller 500 is remote from additive manufacturing system 100. Controller 500 receives orientation information from orientation sensor 502. The orientation information indicates an orientation of base assembly 104 or, more generally, the orientation of additive manufacturing system 100. Orientation sensor 502 may be a gyroscope, or any other similar sensor, configured to measure an orientation of additive manufacturing system 100.

Controller 500 is also configured to receive an angular position θ from angular position sensor 504. The angular position indicates a current angular position of delivery system 120 about central axis 150, according to some embodiments. Controller 500 can monitor the angular position of delivery system 120 to determine/count a number of revolutions of delivery system 120 and therefore track the number of layers of concrete that have been laid by additive manufacturing system 100. Additionally, controller 500 can monitor the angular position of delivery system 120 about central axis 150 and provide the current angular position to a user via HMI 1908. In some embodiments, angular position sensor 504 is a component of primary mover 160. Angular position sensor 504 can be a single angular position sensor or a collection of angular position sensors.

Controller 500 is also configured to receive a height of delivery system 120 from distance sensor 506, according to an exemplary embodiment. Distance sensor 506 may be any of or a collection of an infrared distance sensor, an ultrasonic distance sensor, a transducer, etc., or any other sensor configured to measure a distance between delivery system 120 and base assembly 104 (or between delivery system 120 and ground surface 102). In some embodiments, controller 500 calculates the height of delivery system 120 based on the number of revolutions of delivery system 120 and the pitch diameter $P_d$ of threads 112. Distance sensor 506 can be positioned at a bottom of frame 122 such that distance sensor 506 measures a distance between the bottom of frame 122 and base assembly 104. Distance sensor 506 may also be positioned at a top of elongated member 110 such that distance sensor 506 measures a distance between the top of elongated member 110 and a top surface of frame 122. In some embodiments, controller 500 counts a number of times that frame 122 translates the predetermined amount in direction 10. For example, if delivery system 120 is configured to revolve and print a layer of concrete/material, then translate upwards along elongated member 110 a predetermined amount (e.g., 5 inches), then revolve and print another layer of concrete/material, then translate upwards along elongated member 110 the predetermined amount, etc., controller 500 can count the number of revolutions completed and/or the number of translations along elongated member 110 that delivery system 120 has completed to determine the height of delivery system 120.

Controller 500 can use the height of delivery system 120 to determine when structure 700 is completed. In some embodiments, controller 500 uses the height of delivery system 120 to determine when to stop producing structure 700 (e.g., once structure 700 is at a desired height). Additionally, controller 500 can be configured to determine how much of structure 700 is completed based on the height of delivery system 120. For example, if additive manufacturing system 100 is producing a 60 ft. tall structure 700, and delivery system 120 is at 30 ft., controller 500 can determine that the 60 ft. structure 700 is 50% completed. In some embodiments, controller 500 provides any of the height of delivery system 120, the percent completion of structure 700, etc., to a user via HMI 1908.

Controller 500 receives a user input from HMI 1908, according to an exemplary embodiment. The user input received by controller 500 from HMI 1908 may include any of a desired height of structure 700, a distance between the inner and outer wall of structure 700, a command to start producing structure 700, etc. Controller 500 can use the user input received from HMI 1908 to adjust an operation of any of the primary movers, delivery systems, devices, etc., of additive manufacturing system 100 to produce structure 700 according to the information received via HMI 1908.

HMI 1908 can include a user interface, according to an exemplary embodiment. The user interface may be any of a display screen, an LCD screen, an LED screen, a touchscreen, etc. HMI 1908 also includes one or more user input devices. The user input devices may include any number of buttons, knobs, levers, switches, actuators, etc., configured to receive a user input. In some embodiments, HMI 1908 is a personal computer device and is wirelessly connected to controller 500. For example, HMI 1908 may be a smartphone, a laptop computer, etc., or any other personal computer device. HMI 1908 may be configured to receive user inputs via the personal computer device (e.g., via an app). HMI 1908 may communicably connect with controller 500 using any wireless communications protocol, including but not limited to Bluetooth, LoRA, Zigbee, etc.

Controller 500 can include a communications interface. The communications interface may facilitate communications between controller 500 and external systems, devices, sensors, etc. (e.g., primary mover 160, orientation sensor 502, angular position sensor 504, distance sensor 506, etc.) for allowing user control, monitoring, and adjustment to any of the communicably connected devices, sensors, systems, primary movers, etc. The communications interface may also facilitate communications between controller 500 and HMI 1908. The communications interface may facilitate communications between controller 500 and HMI 1908 (e.g., a touch screen, a display screen, a personal computer, etc.).

The communications interface can be or include wired or wireless communications interfaces (e.g., jacks, antennas, transmitters, receivers, transceivers, wire terminals, etc.) for conducting data communications with sensors, devices, systems, etc., of additive manufacturing system 100 or other external systems or devices (e.g., an administrative device). In various embodiments, communications via the communications interface can be direct (e.g., local wired or wireless communications) or via a communications network (e.g., a WAN, the Internet, a cellular network, etc.). For example, the communications interface can include an Ethernet card and port for sending and receiving data via an Ethernet-based communications link or network. In another example, the communications interface can include a Wi-Fi transceiver for communicating via a wireless communications network. In some embodiments, the communications interface is or includes a power line communications interface. In other embodiments, the communications interface is or includes an Ethernet interface, a USB interface, a serial communications interface, a parallel communications interface, etc.

Controller 500 includes a processing circuit 1902, a processor 1904, and memory 1906. Processing circuit 1902 can be communicably connected to the communications interface such that processing circuit 1902 and the various components thereof can send and receive data via the communications interface. Processor 1904 can be implemented as a general purpose processor, an application specific integrated circuit (ASIC), one or more field programmable gate arrays (FPGAs), a group of processing components, or other suitable electronic processing components.

Memory 1906 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1906 can be or include volatile memory or non-volatile memory. Memory 1906 can include database components, object code components, script components, or any other type of information structure for supporting the various activities and information structures described in the present application. According to some embodiments, memory 1906 is communicably connected to processor 1904 via processing circuit 1902 and includes computer code for executing (e.g., by processing circuit 1902 and/or processor 1904) one or more processes described herein.

In some embodiments, controller 500 is implemented within a single computer (e.g., one server, one housing, etc.). In various other embodiments controller 500 can be distributed across multiple servers or computers (e.g., that can exist in distributed locations).

Controller 500 provides direction and angular speed co to primary mover 160. The direction may be either clockwise about central axis 150 (e.g., direction 144) or counterclockwise about central axis 150 (e.g., in a direction opposite direction 144). Controller 500 can receive a user input of $h_{desired}$ of structure 700 from HMI 1908 and a current height $h_{current}$ of structure 700 from distance sensor 506. When controller 500 receives an indication to start producing structure 700, controller 500 may send a signal to primary mover 160 to rotate delivery system 120 in a direction $\omega_{down}$ that causes delivery system 120 to translate downwards along elongated member 110. Once controller 500 determines that delivery system 120 is at the bottom position of elongated member 110 (e.g., once the height value received from distance sensor 506 is substantially equal to zero or equal to a predetermined value), controller 500 stops primary mover 160 from continuing to rotate delivery system 120. Once delivery system 120 is at the bottom most position along elongated member 110 (or at a predetermine start position along elongated member 110), additive manufacturing system 100 is ready to begin producing structure 700.

If additive manufacturing system 100 includes a drive system for translating nozzle assembly 134 along second member 128 and a drive system for translating structural support delivery device 130 along first member 126, controller 500 can provide control/drive signals to primary movers 200 of the drive systems to translate nozzle assembly 134 and structural support delivery device 130 along the respective members to achieve a desired radial position. In some embodiments, the desired radial position is a desired diameter of structure 700 as indicated by a user and received by controller 500 via HMI 1908. Controller 500 may send control/drive signals to primary movers 200 to translate nozzle assembly 134 along second member 128 and to translate structural support delivery device 130 to the desired radial positions (e.g., to increase or decrease radial distance 132 and/or radial distance 140). Controller 500 may also send control signals to primary movers 200 to increase or decrease the distance between concrete delivery device 136a and concrete delivery device 136b (e.g., to translate concrete delivery device 136a along second member 128 relative to concrete delivery device 136b) to achieve a desired spacing of the inner and outer walls of structure 700. Primary movers 200 may represent any motors, engines, actuators, etc., of additive manufacturing system 100 such as primary mover 160, hydraulic cylinders 111, etc.

Controller 500 can also provide control signals to hydraulic cylinders 111 (e.g., to extend or retract any of hydraulic cylinders 111) to automatically level additive manufacturing system 100. Controller 500 can cause support members 106 to articulate, extend, rotate, etc., by sending control signals to a primary mover of each support member 106 (e.g., hydraulic cylinders 111). Controller 500 can use the orientation information received from orientation sensor 502 to determine control signals for each primary mover of support members 106.

Controller 500 sends control signal to primary mover 160 to cause delivery system 120 to rotate in a direction such that delivery system 120 translates upwards along elongated member 110. Controller 500 may send control signals to primary mover 160 to cause delivery system 120 to rotate in the direction at a predetermined angular velocity $\omega_{print}$. In some embodiments, the predetermined angular velocity is slow enough such that the concrete dispensed by concrete delivery device 136a and concrete delivery device 136b has time to reach ground surface 102 (or the top layer of previously dispensed/laid concrete).

Controller 500 can also provide control signals to the moving device (e.g., a primary mover that drives an auger, a pump, etc.) that provides the concrete to concrete delivery device 136a and concrete delivery device 136b. Controller 500 may operate the moving device to provide the concrete to concrete delivery device 136a and concrete delivery device 136b over the entirety of production of structure 700. Controller 500 may also send control signals to one or more of the primary movers that drive the dispensing device of concrete delivery device 136a and or the one or more primary movers that drive the dispensing device of concrete delivery device 136b. Controller 500 may operate the dispensing devices of concrete delivery device 136a and concrete delivery device 136b such that the concrete is dispensed at a volumetric flow rate that is sufficient to lay the concrete on ground surface 102 or on a previously dispensed layer of concrete.

Controller 500 can monitor the height of delivery system 120 throughout the production of structure 700. In some embodiments, controller 500 monitors the height of delivery system 120 received from distance sensor 506. In some embodiments, controller 500 determines a height of delivery system 120 by counting a number of revolutions of delivery system 120 (and using the pitch diameter $P_d$ of threads 112) and using the known distance 1104 that delivery system 120 translates along elongated member 110 for each revolution. Once the height of structure 700 reaches a desired height (as input to controller 500 by a user via HMI 1908), controller 500 may stop primary mover 160 from rotating, and stop concrete delivery device 136a and concrete delivery device 136b from dispensing concrete.

Controller 500 may provide control signals to structural support delivery device 130 throughout the production of structure 700. The control signals may indicate that structural support delivery device 130 should provide structural support member 350 to concrete/material dispensed/laid by concrete delivery device 136*a* and concrete delivery device 136*b*. The control signals may also cause a primary mover of structural support delivery device 130 to translate structural support delivery device 130 back and forth along first member 126.

Controller 500 can also provide HMI 1908 with output information. The output information may include modes of operation of additive manufacturing system 100 (e.g., READY, CURRENTLY LEVELING, WARNING, IN PROGRESS, COMPLETED, etc.), requests for the user to input one or more parameters of structure 700, etc. HMI 1908 can provide an of the received output information to a user via a display device. Controller 500 may provide a message indicating that structure 700 is in the progress of being constructed throughout the construction of structure 700. In some embodiments, controller 500 is configured to provide the user with a warning regarding a malfunction of any of the equipment of additive manufacturing system 100. Controller 500 can also output a message to the user via HMI 1908 that structure 700 is completed in response to completing structure 700.

Figure 20A:
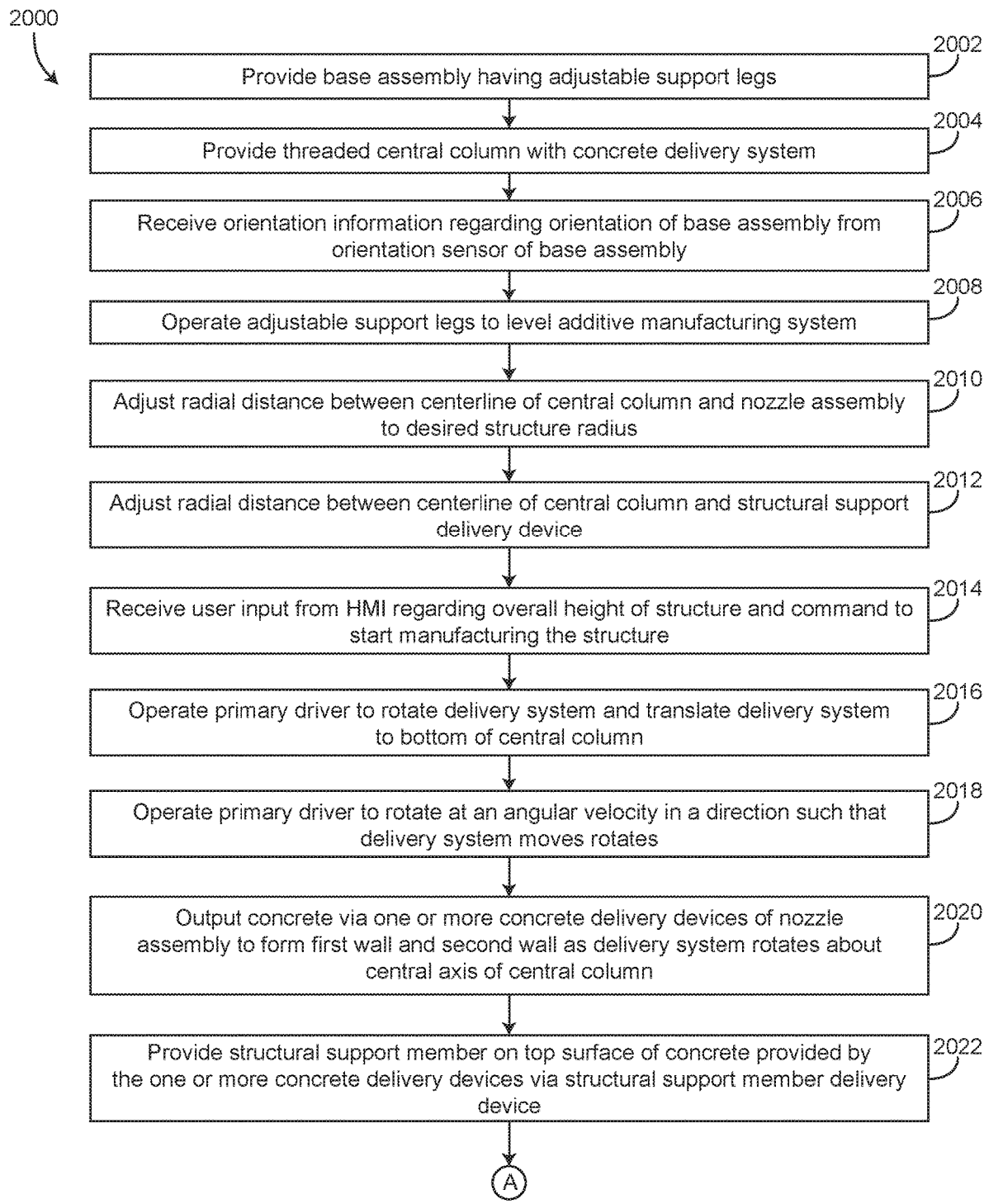
FIGS. 20A-20B are a flow diagram of a process for producing a structure using the additive manufacturing system of FIG. 1, according to an exemplary embodiment.
Figure 20B:
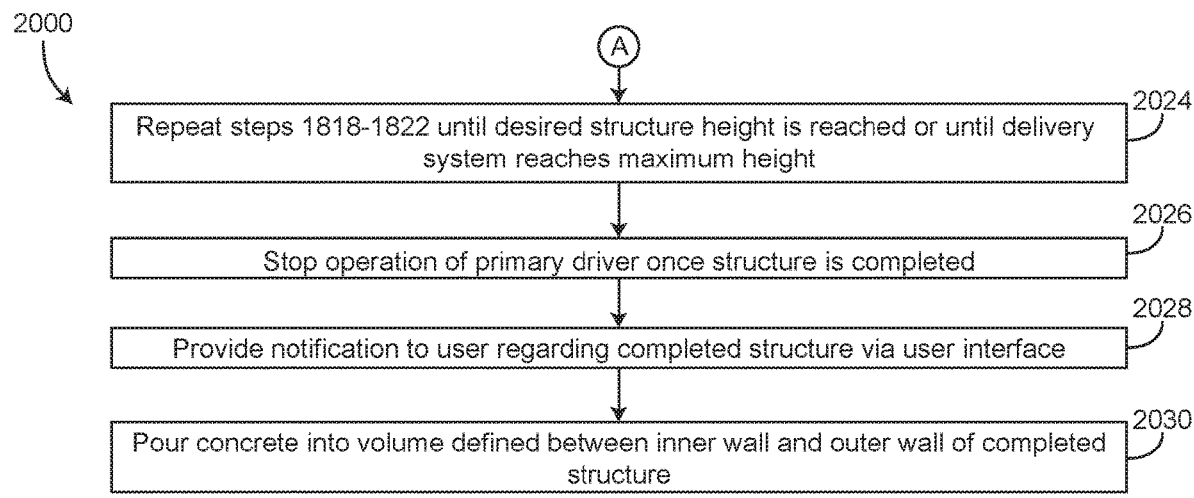

Referring now to FIGS. 20A-20B, a process 2000 for producing a concrete structure using additive manufacturing is shown, according to an exemplary embodiment. Process 2000 includes steps 2002-2030. Process 2000 includes providing a base assembly having adjustable support legs (step 2002). The base assembly may base assembly 104. Step 2002 can be performed by a worker that sets up additive manufacturing system 100.

Process 2000 includes providing a threaded central column with a concrete delivery system (step 2004). The threaded central column is or is similar to elongated member 110. Step 2004 can be performed by workers that construct additive manufacturing system 100. Step 2004 can be performed prior to transporting additive manufacturing system 100 to a jobsite. In other embodiments, step 2004 is performed by a worker at the jobsite. Step 2004 may include adding additional sections of the threaded central column (i.e., elongated member 110) such that additive manufacturing system 100 can produce a particular structure 700 with a desired height. In other embodiments, the central column is not threaded. The central column may include annular and/or longitudinal grooves, tracks, etc. to facilitate independent rotation and translation of delivery system 120 along the central column (e.g., elongated member 110).

Process 2000 includes receiving orientation information of the base assembly from an orientation sensor (step 2006). Step 2006 may be performed by controller 500. The orientation sensor is or is similar to orientation sensor 502. The orientation information received from the orientation sensor may include angulation of the base assembly or the additive manufacturing system in a coordinate system (e.g., a global coordinate system). For example, the orientation information may include pitch, slope, roll, etc., of the base assembly and/or the additive manufacturing system about a global X axis, a global Y axis, and a global Z axis.

Process 2000 includes operating adjustable support legs of the base assembly to level the additive manufacturing system (step 2008). Step 2008 may be performed by controller 500 and support members 106. Step 2008 may include sending control signals to one or more primary movers (e.g., hydraulic cylinders, motors, etc.) of any of support members 106 to level additive manufacturing system 100. Step 2008 can be performed by articulating, extending, rotating, pivoting, any sections of support members 106 to level additive manufacturing system 100. In some embodiments, step 2008 is performed before additive manufacturing system 100 builds/constructs structure 700 to ensure that structure 700 is not tilted.

Process 2000 includes adjusting a radial distance between a centerline of the central column and a nozzle assembly to a desired radius of the structure (step 2012). Step 2012 can include adjusting (e.g., increasing or decreasing) radial distance 140 to position nozzle assembly 134 at a desired radial distance that is substantially equal to a desired radius of the structure that additive manufacturing system 100 will produce. Process 2000 may include a step of receiving the desired radius of the structure from HMI 1908 before step 2012. Step 2012 can be performed by controller 500, a primary mover, and a powertrain system configured to translate nozzle assembly 134 along second member 128.

Step 2010 can include adjusting a distance between one or more nozzles (e.g., concrete delivery device 136*a* and concrete delivery device 136*b*) to achieve a desired radial distance therebetween. The desired radial distance may be a desired radial distance between the inner wall and the outer wall (e.g., inner wall 1210 and outer wall 1208) of the structure (e.g., structure 700) that the additive manufacturing system will produce. The desired distance between the inner wall and the outer wall may be provided to controller 500 via HMI 1908.

Process 2000 includes adjusting a radial distance between a centerline of the central column and a structural support delivery device (step 2012). Step 2012 can be performed similarly to step 2010 but for structural support delivery device 130. For example, step 2012 may include sending control signals to a primary mover to translate structural support delivery device 130 along first member 126. Step 2012 can be performed by controller 500, a primary mover of structural support delivery device 130, and a power train system (e.g., a track) to reposition structural support delivery device 130 to a radial location along first member 126. Step 2012 can include positioning driving devices 131 of structural support delivery device 130 to a radial distance such that structural support member 350 can be provided to layers of concrete/material dispensed/provided by concrete delivery devices 136.

Process 2000 includes receiving a user input from an HMI regarding an overall height of the structure, and a command to start manufacturing the structure (step 2014). The overall height of the structure may be received by controller 500 from HMI 1908. The overall height indicates a desired height of structure 700. Controller 500 can use the desired height to determine when to stop manufacturing structure 700. The command to start manufacturing the structure can be received by controller 500. Controller 500 can use the command to begin building structure 700.

Process 2000 includes operating a primary driver to rotate the delivery system and to translate the delivery system to the bottom of the central column (step 2016). Step 2016 can be performed by controller 500, primary mover 160, and delivery system 120. Step 2016 may be performed if delivery system 120 is not already at the bottom end (or at a starting point) along elongated member 110. Delivery system 120 may translate along elongated member 110 due to a threaded coupling between elongated member 110 and frame 122 and the rotation of frame 122 relative to elongated member 110. Step 2016 may include receiving, at controller 500, distance information from distance sensor 506, and operating primary mover 160 to rotate and translate delivery system 120 downwards along elongated member 110 until the distance information from distance sensor 506 indicates that delivery system 120 is at the bottom end (or at a starting position) of elongated member 110. In some embodiments, (e.g., if elongated member 110 is not threaded), delivery system 120 is configured to translate along elongated member 110 without rotating and vice versa, and step 2016 recites translating the delivery system to the bottom of the central column (without requiring rotation).

Process 2000 includes operating the primary driver (e.g., primary mover 160) to rotate the delivery system (e.g., delivery system 120) at an angular velocity co in a direction (relative to elongated member 110/the central column) (step 2018). Step 2018 can be performed by controller 500, primary mover 160, and delivery system 120. Delivery system 120 can translate along elongated member 110 as it rotates due to the threaded coupling between frame 122 and elongated member 110. In some embodiments, (e.g., if elongated member 110 is not threaded), delivery system 120 is configured to translate along elongated member 110 without rotating and vice versa, and step 2018 recites translating the delivery system to the bottom of the central column (without requiring rotation). In some embodiments, step 2018 recites operating the primary driver (e.g., primary mover 160) to rotate the delivery system (e.g., delivery system 120) at an angular velocity co in a direction (relative to elongated member 110/the central column) such that the delivery system both rotates as well as translates upwards along the central column.

Process 2000 includes outputting concrete (or any other material such as a slurry) via one or more concrete delivery devices (e.g., nozzles) of the nozzle assembly to form a first wall and a second wall as the delivery system rotates about a central axis of the central column (step 2020). Step 2020 may be performed concurrently with step 2018. Step 2020 can be performed by controller 500, and nozzle assembly 134 (or, more specifically, concrete delivery device 136a and concrete delivery device 136b). The first wall and the second wall that are formed during step 2020 may be inner wall 1210 and outer wall 1208 of structure 700.

Process 2000 may include a step 1821 between steps 2020 and 2022 of translating delivery system 120 upwards along elongated member 110. Step 1821 may be included if delivery system 120 is configured to independently rotate and translate relative to elongated member 110. Delivery system 120 may translate upwards along elongated member 110 a predetermined distance to position delivery system 120 at a vertical position for a next iteration of concrete/material printing.

Process 2000 includes providing a structural support member to the concrete/material provided by the one or more concrete delivery devices via a structural support member delivery device (step 2022). Step 2022 may be performed concurrently with steps 2018 and 2020. In other embodiments, step 2022 is performed after steps 2018-2020 (and steps 1821, if included) have been performed a predetermined number of times to provide a predetermined number of layers of concrete/material. Step 2022 can be performed after delivery system 120 has rotated a predetermined angular amount (e.g., every 10 degrees, every 20 degrees, etc.). Step 2022 can be performed after structural support delivery device 130 has travelled a predetermined arc distance (e.g., every 10 inches, every 12 inches, etc.). Step 2022 can be performed multiple times to provide multiple structural support members 350 to the concrete/material laid by concrete delivery devices 136. In some embodiments, step 2022 is performed after delivery system 120 has laid a predetermined number of layers of concrete/material. Step 2022 can be performed by controller 500 and structural support delivery device 130. The structural support member may be rebar, or any other structural support. Step 2022 may include providing the structural support member between the first wall and the second wall and/or into the first wall and the second wall as the delivery system rotates and/or translates. The structural support member can be provided directly on top of a surface of a recently applied layer of concrete (as applied/dispensed in step 2020) and/or into the recently applied layers of concrete (as applied/dispensed in step 2020). In some embodiments, step 2022 is performed every X number (e.g., every 10 revolutions) of revolutions of delivery system 120 or after delivery system 120 has provided a predetermined height of concrete/material.

Process 2000 includes repeating (or continually performing) steps 2018-2022 until the desired height of the structure is produced/reached or until the delivery system reaches its maximum height (e.g., reaches an upper most allowable point on the central column/elongated member 110) (step 2024). A current height of the delivery system at any point in time can be received from distance sensor 506 (and used as the current height of the structure, or used to determine the current height of the structure) or can be determined by counting a number of revolutions of the delivery system that have been completed. Controller 500 is configured to perform step 2024. Once controller 500 determines that the desired structure height has been reached, controller 500 stops performing step 2024 (step 2026) (e.g., stops performing steps 2018-2022).

Process 2000 includes providing a notification to a user regarding the completion of the structure via a user interface (step 2028). Step 2028 can be performed by controller 500 and HMI 1908. The notification may indicate that the structure has been completed.

Process 2000 includes pouring concrete into a volume defined between the inner wall and the outer wall of the completed structure (step 2030). The concrete may be poured into volume 1212 defined between inner wall 1210 and outer wall 1208. Step 2020 can be performed by any concrete delivery system, such as a conveyor belt system, a pump system, etc. In some embodiments, step 2020 includes repositioning at least one of the one or more concrete delivery devices (e.g., concrete delivery device 136a and/or concrete delivery device 136b) along second member 128 such that at least one of the concrete delivery devices are above the volume defined between the inner wall and the outer wall of the completed structure. Step 2020 can further include dispensing/pouring concrete into the volume between the inner wall and the outer wall of the completed structure via the concrete delivery devices.

Referring now to FIGS. 26-33, various structures that can be produced by additive manufacturing system 100 are shown, according to various embodiments. Structure 2600 of FIG. 26 corresponds to the embodiment when additive manufacturing system 100 includes two concrete delivery devices 136 and is delivery system 120 configured to rotate and print a layer of concrete/material, then translate upwards along central axis 150, and repeat this process to produce stacked layers of concrete. Structure 2700 of FIG. 27 corresponds to the embodiment when additive manufacturing system 100 includes two concrete delivery devices 136 and delivery system 120 is configured to rotate and translate along elongated member 110 and print concrete while rotating/translating. Structure 2800 of FIG. 28 corresponds to the embodiment when additive manufacturing system 100 includes two concrete delivery devices 136, one of which actuates along second member 128, and provides stacked layers of concrete/material (e.g., by rotating and printing material, then translating, then rotating and printing material/concrete, etc.). Structure 2900 of FIG. 29 corresponds to the embodiment when additive manufacturing system 100 includes three concrete delivery devices 136, one of which actuates along second member 128. Structure 3000, 3100, 3200, and 3300 of FIGS. 30-33 correspond to similar embodiments of FIGS. 26-29, respectively, but elongated member 110 is installed in ground surface 102 and is integrated as a structural support member of the structure with various structural support members extending radially between elongated member 110 and one of the sidewalls of structure 700.

Figure 34:
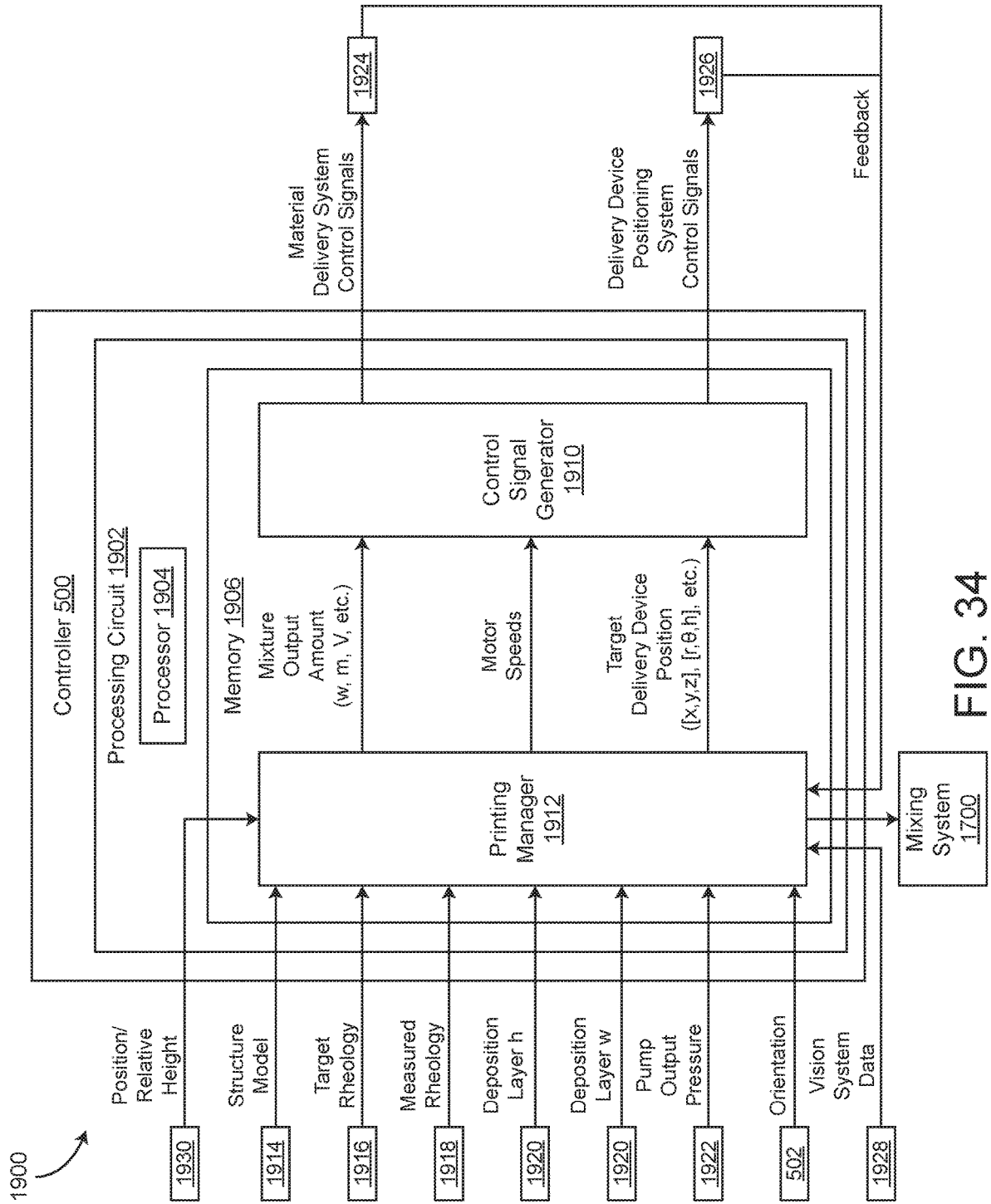
FIG. 34 is a block diagram showing a controller of the control system of FIG. 19 in greater detail, according to an exemplary embodiment.

Referring now to FIG. 34, a block diagram of control system 1900 illustrating controller 500 in greater detail is shown, according to an exemplary embodiment. Control system 1900 includes controller 500 that is configured to operate or generate control signals for a delivery device positioning system 1926 and a material delivery system 1924. Delivery device positioning system 1926 can be or include any primary movers, electric motors, actuators (e.g., linear electric actuators, linear pneumatic actuators, linear hydraulic actuators, rotary actuators, etc.) that are configured to adjust a position of concrete delivery devices 136. For example, delivery device positioning system 1926 can be or include primary mover 160 or primary mover(s) 200. Delivery device positioning system 1926 can be configured to adjust a spatial location or position of concrete delivery devices 136 in one or more directions (e.g., a vertical direction, multiple horizontal directions, etc.).

Material delivery system 1924 can be or include any devices, pumps, motors, primary movers, etc., that are configured to operate to drive material or mixture to concrete delivery devices 136 for additive manufacturing. For example, material delivery system 1924 can include auger 1612, auger motor 1614, or primary mover 160 (e.g., if primary mover 160 is configured to drive auger 1612 to facilitate the transport of mixture, material, or concrete to concrete delivery devices 136). Material delivery system 1924 can include one or more electric primary movers (e.g., electric motors, electric linear actuators, etc.) that are configured to drive or facilitate the transport of mixture (e.g., from material reservoir 1610) to concrete delivery devices 136.

Memory 1906 of controller 500 includes a printing manager 1912 and a control signal generator 1910. Printing manager 1912 is configured to receive or use a variety of inputs (e.g., a position of concrete delivery devices 136, a relative height between concrete delivery devices 136 and a previous deposition layer, a model of a structure, a target rheology value, a measured rheology, a deposition layer height, a deposition layer width, a pump output pressure, an orientation, vision system data, feedback data, etc.) to determine a target delivery device position, an amount of mixture to be output (e.g., a feed rate), and one or more motor speeds. Printing manager 1912 is configured to output the target delivery device position and the amount of mixture to be output to control signal generator 1910. Control signal generator 1910 uses the target delivery device position and the mixture output amount to generate the control signals for delivery device positioning system 1926 and material delivery system 1924 (e.g., delivery device positioning system control signals and material delivery system control signals). The delivery device positioning system control signals are provided to delivery device positioning system 1926 so that concrete delivery devices 136 are operated to travel along or to the target delivery device position. In some embodiments, the target delivery device position is a spatial position that concrete delivery devices 136 are spatially transitioned to, or relocated to. In other embodiments, the target delivery device position is multiple positions or a path that concrete delivery devices 136 are operated to travel along.

For example, the target delivery device position may be a position along the path for a future timestep, $p_{k+1}$ compared to a position that concrete delivery devices are currently at along the path, $p_k$. The target delivery device position may be expressed in Cartesian coordinates, polar coordinates, cylindrical coordinates, spherical coordinates, etc. For example, the position $p_{k+1}$ at the future timestep k+1 may be [x, y, z] coordinates, [x, y] coordinates, [r, $\theta_1$, $\theta_2$] coordinates, [r, $\theta_1$] coordinates, etc. In some embodiments, the target delivery device position is a function $f$ that expresses the path along which concrete delivery devices 136 are driven to travel. Control signal generator 1910 can generate control signals for delivery device positioning system 1926 to drive concrete delivery devices 136 to travel along the path. In some embodiments, the target delivery device position is a position or a function of a path that is adjusted relative to a baseline position or a baseline path to account for variations or uncertainty in additive manufacturing system 100.

Control signal generator 1910 is also configured to provide the mixture output amount to material delivery system 1924 so that concrete delivery devices 136 dispense, discharge, output, lay, emit, etc., the mixture output amount. The mixture output amount may be a mass, a volume, a weight, etc., or any other quantity of mixture to be output as concrete delivery devices 136 travel along a corresponding path. In some embodiments, the mixture output amount is an amount that is dispensed as concrete delivery devices 136 travel from a first position or location along the path to a second position or location along the path. In some embodiments, the mixture output amount is the amount of mixture that should be output over a time interval (e.g., 0.5 seconds, 1 second, etc.). In some embodiments, the mixture output amount is the amount of mixture that should be output as concrete delivery devices 136 travel a distance along their paths. For example, the mixture output amount may be a quantity per an amount of time or between two points along the path such as a mass quantity m, a weight quantity w, or a volume quantity V, a mass flow rate $\dot{m}$, a weight flow rate $\dot{w}$, a volumetric flow rate $\dot{V}$, a mass quantity per distance travelled along the path by the concrete delivery devices 136 (e.g., kilograms per meters, lbm per inches, etc.), a weight quantity per distance travelled along the path by the concrete delivery devices 136 (e.g., Newtons per meters, pounds per inches, etc.), a volumetric quantity per distance travelled along the path by the concrete delivery devices 136 (e.g., cubic meters per meters, cubic inches per inches, etc.), etc. In some embodiments, the mixture output amount is a feed rate of material that is provided to concrete delivery device 136. For example, the mixture output amount may indicate a speed at which to operate auger motor 1614.

In some embodiments, the motor speeds are motor speeds for mixing system 1700 of additive manufacturing system 100 (e.g., a system that produces the material using various ingredients), a pump that operates to provide the material to concrete delivery devices 136 (e.g., auger 1612, auger motor 1614, etc.) or for various discharge pumps of concrete delivery devices 136. For example, concrete delivery devices 136 can each include a corresponding pump or discharge devices that include a motor that operates to discharge the material at a desired feed rate.

Printing manager 1912 is configured to receive inputs of a structure model, a target rheology of the mixture, a measured rheology of the mixture, a deposition layer height h, the deposition layer width w, the pump output pressure, the orientation, vision system data, and current position, and use the inputs to determine, estimate, adjust, generate, etc., the mixture output amount and/or the target delivery device position.

The structure model may be a CAD model, a STEP file, etc., or any other 3-d or 2-d model of a structure that is to be produced by additive manufacturing system 100. The structure model can be stored in memory 1906 of controller 500, and may be uploaded from a device 1914 (e.g., another controller, a human machine interface, a user device, a remote system, etc.). Printing manager 1912 uses the structure model to determine the mixture output amount, paths for concrete delivery devices 136 to travel along, the target delivery devices position, future positions for the concrete delivery devices 136, etc.

The target rheology can be desired or optimal values of one or more rheological properties of the mixture or material that is provided to concrete delivery devices 136 for additive manufacturing. For example, the target rheology may be a desired value of a slump of the mixture, a desired value of viscosity (e.g., dynamic or kinematic), or a desired value of any other rheological property. In some embodiments, the target rheology is stored within memory 1906 and is a predetermined or predefined value. In other embodiments, the target rheology is determined, or calculated by printing manager 1912. For example, the target rheology may be determined by printing manager 1912 based on any of or a combination of the structure model, the relative height of concrete delivery devices 136, various properties of the structure model (e.g., wall thickness at various locations), the deposition layer height h, the deposition layer width w, the pump output pressure, the orientation of additive manufacturing system 100, the vision system data, a type of structural support member 350 that is provided to the dispensed or layered material, etc. In other embodiments, the target rheology is provided to printing manager 1912 from an input device 1916. Input device 1916 can be the same as or similar to device 1914.

The measured rheology can be a measured, current, or actual value of a rheological property of the mixture or material that is provided to concrete delivery devices 136 for additive manufacturing. The mixture or material can be produced or mixed in batches within a mixer drum or within material reservoir 1610. In some embodiments, a technician may mix or produce the mixture using local ingredients and can measure various rheological properties of the batch. The technician can provide the measured or actual rheology to printing manager 1912 for each batch through a device 1918. Device 1918 can be the same as or similar to device 1914, input device 1916, a human machine interface, a user device, a user input device, a touchscreen display, etc. In other embodiments, device 1918 is a rheological sensor (e.g., a batch sensor) that is configured to automatically detect a value of a rheological property of the mixture and provide the detected value of the rheological property (or multiple rheological properties) to printing manager 1912. For example, a rheological sensor in communication with controller 500 can be positioned within material reservoir 1610, inner volume 1602, rotary union 1906, inner volume 1604, concrete delivery devices 136, inner volume 1608, etc.

The deposition layer height h or the deposition layer width w can be provided to printing manager 1912 from one or more sensors 1920. The sensors 1920 can be or include a camera, various laser sensors, etc., or any other sensor that is configured to monitor a previously dispensed layer and obtain height h and width w measurements of the previously dispensed layer (e.g., the deposition layer). The height h and the width w of the previously dispensed deposition layer can be provided to printing manager 1912 for use in determining the mixture output amount and/or the target delivery device position.

In some embodiments, printing manager 1912 is also configured to use the structure model to determine a desired height $h_{desired}$ and a desired width $w_{desired}$ of the deposition layer. For example, printing manager 1912 can use the desired height $h_{desired}$ and the desired width $w_{desired}$ in combination with the height h and the width w of the deposition layer as obtained by sensors 1920 to determine a difference $\Delta h$ between the actual height h of the deposition layer and the desired height $h_{desired}$ of the deposition layer and a difference $\Delta w$ between the actual width w and the desired width $w_{desired}$ of the deposition layer. Printing manager 1912 may use the difference $\Delta h$ and the difference $\Delta w$ to determine, adjust, estimate, calculate, generate, output, etc., the mixture output amount and/or the target delivery device position. For example, if printing manager 1912 determines that the desired height $h_{desired}$ is greater than the actual height h of the deposition layer, printing manager 1912 may determine that additional deposition layers should be added to achieve an overall desired height or geometry of the structure being produced by additive manufacturing system 100, and the mixture output amount and/or the target delivery device position may be adjusted so that control signal generator 1910 operates material delivery system 1924 and delivery device positioning system 1926 so that additional deposition layers are dispensed. In some embodiments, the height h of the deposition layer and the width w of the deposition layer are monitored in real-time by controller 500 and sensors 1920. In some embodiments, sensors 1920 are the same as or similar to vision system 1928. In some embodiments, the deposition layer height h and/or the deposition layer width w are physically measured by a technician or an operator of additive manufacturing system 100 and are provided to controller 500 through a user interface, a human machine interface, a user input device, etc.

Printing manager 1912 is also configured to obtain, calculate, determine, estimate, etc., pump output pressure. In some embodiments, printing manager 1912 is configured to estimate the pump output pressure based on any of the inputs or is configured to obtain the pump output pressure from a pump sensor 1922. In other embodiments, printing manager 1912 is configured to use a combination of sensor data obtained from pump sensor 1922 or feedback from a motor sensor of auger motor 1614 in combination with any of the received inputs to determine the pump output pressure. The pump output pressure may indicate or be related to a pressure or a force which the dispensed, output, discharged, etc., material is provided to a previously dispensed deposition layer. In some embodiments, the pump output pressure is determined or calculated by printing manager 1912 based on a relative height between concrete delivery devices 136 and the previously dispensed deposition layer. For example, a smaller height or relative distance between concrete delivery devices 136 and the previously dispensed deposition layer may indicate or correlate to a higher pump output pressure. In some embodiments, a higher motor speed of auger motor 1614 or a higher motor torque or a higher rotational speed of auger 1612 indicates or is correlated to a higher pump output pressure.

In some embodiments, printing manager 1912 uses a predefined relationship, a function, etc., to determine or calculate the pump output pressure using feedback from auger motor 1614 and the relative height between the concrete delivery devices 136 and the previously provided deposition layer. The pump output pressure can indicate an amount of spreading that occurs when the mixture or the material is provided to the previously dispensed deposition layer. For example, the mixture or the material may be provided to a top of a previously dispensed deposition layer that is still curing or still soft with some amount of discharge force (e.g., output pressure). The amount of output force or the pump output pressure or output pressure may cause the mixture or the material to be pressed into the previously dispensed deposition layer, facilitating improvement in the bond between subsequently dispensed deposition layers.

In some embodiments, printing manager 1912 is configured to generate target delivery device and mixture output amount that result in improved bonding between subsequently dispensed deposition layers. For example, printing manager 1912 can increase the pump output pressure by providing mixture output amounts to control signal generator 1910 that result in the auger 1612 being driven at a higher speed and by providing target delivery device positions to control signal generator 1910 that result in the relative distance between concrete delivery devices 136 and the previously dispensed deposition layer being decreased. In this way, controller 500 can control, adjust, improve, etc., the bond between subsequently dispensed deposition layers by driving the auger 1612 at a particular speed and operating delivery device positioning system 1926 so that the relative distance between concrete delivery devices 136 and the previously dispensed deposition layer is at a particular value (e.g., to achieve a desired pump output pressure and to facilitate improved bonding between subsequent deposition layers of the material).

In some embodiments, printing manager 1912 is configured to use the orientation of the additive manufacturing system 100 to determine the mixture output amount and/or the target delivery device position. For example, printing manager 1912 may receive the orientation from orientation sensor 502 and use the orientation of additive manufacturing system 100 to determine values of the mixture output amount or the target delivery device position. For example, if printing manager 1912 determines that additive manufacturing system 100 has tilted in one or more directions, printing manager 1912 may adjust the target delivery device position or the path that concrete delivery devices 136 travel along to account for the change in orientation of additive manufacturing system 100. In some embodiments, controller 500 uses the orientation as obtained by orientation sensor 502 to generate control signals for hydraulic cylinders 111 to automatically level additive manufacturing system 100 as described in greater detail above with reference to FIG. 19.

Referring still to FIG. 34, printing manager 1912 can be configured to use vision system data as obtained by vision system 1928 to determine the mixture output amount and/or target delivery device position. In some embodiments, printing manager 1912 uses an enhanced vision system that is configured to scan the previous deposition layer. The vision system 1928 can provide scan data or vision system data to printing manager 1912 which may use the scan data to generate a scan model or a graphical representation of the structure that has been produced by additive manufacturing system 100 thus far. Printing manager 1912 can compare the scan model to the structure model to identify deviations of the model from the structure model. In some embodiments, printing manager 1912 is configured to use the deviations of the scan model relative to the structure model (e.g., a desired geometry or construction of the structure) to determine or adjust the mixture output amount (e.g., the feed rate) and/or the target delivery device position (e.g., the path that concrete delivery devices 136 follow) based on the comparison or deviations between the scan model and the structure model. In this way, controller 500 may operate additive manufacturing system 100 (e.g., material delivery system 1924 and/or delivery device positioning system 1926) to perform corrective actions to account for deviations between the scan model and the structure model. In some embodiments, vision system 1928 is or includes a physical measurement system that is configured to identify where a previous deposition layer is and various properties or geometry of the previous deposition layer. For example, the physical measurement system may include probes, rollers, extension sensors, distance sensors, etc., that are configured to measure various properties or geometry of the previous deposition layer.

Printing manager 1912 can also obtain a position of concrete delivery devices 136 or a relative height between concrete delivery devices 136 and a previous deposition layer and use the position of concrete delivery devices 136 or the relative height to determine the mixture output amount and/or the target delivery device position. In some embodiments, printing manager 1912 is configured to obtain the position of concrete delivery devices 136 from a position sensor 1930. For example, position sensor 1930 may be a Global Positioning System (GPS) such as a short wave GPS. In some embodiments, position sensor 1930 is or includes a relative height sensor (e.g., an infrared emitter, a distance sensor, etc.) that is configured to measure the height between concrete delivery devices 136 and the previous deposition layer. The relative height sensor may be position at each of concrete delivery devices 136 and can be oriented in a downwards position to detect a relative distance or height between concrete delivery devices 136 and the previous deposition layer of the material. In some embodiments, printing manager 1912 is configured to receive or obtain feedback data (e.g., feedback signals) from delivery device positioning system 1926 that indicate a current position of concrete delivery devices 136. In this way, printing manager 1912 can monitor a current position of each of concrete delivery devices 136 and/or a relative height or a relative distance between each of concrete delivery devices 136 and the previous deposition layer in real-time.

Printing manager 1912 can also be configured to use multiple parameters that are determined based on the received inputs (e.g., the position/relative height, the structure model, the target rheology, the measured rheology, the deposition layer height h, the deposition layer width w, the pump output pressure, the orientation, the vision system data, the feedback, etc.) to determine any of the mixture output amount, various motor speeds, and/or the target delivery device position. For example, printing manager 1912 can use the structure model to determine one or more paths that concrete delivery devices 136 should follow, a number of deposition layers that should be dispensed by concrete delivery devices 136 to produce the structure, a number of passes concrete delivery devices 136 should make along a path to produce the structure, a thickness or height of deposition layers to produce the structure, portions of the path that material should not be discharged along, portions of the path for a particular one or more passes that material should not be discharged along, etc. In some embodiments, printing manager 1912 is configured to determine the mixture output amount (or a feed rate of the material) based on any of or a combination of motor torques (e.g., of mixing system 1700 that operates to mix and produce the material, a torque exerted on auger 1612 by auger motor 1614, motor torque of a pump at concrete delivery devices 136, etc.), motor speeds (e.g., a speed of a motor of mixing system 1700, a speed of auger 1612 and/or auger motor 1614, a speed of the pump at concrete delivery devices 136, etc.), sensor feedback from a load sensor of additive manufacturing system 100 (e.g., a load cell that measures a weight of material in the mixing system 1700, a load cell that measures a weight of material driven by auger 1612 and/or auger motor 1614, a load cell that measures a weight of concrete delivery devices 136 or a weight of material passing through concrete delivery devices 136, etc.), the pump output pressure, or a target feed rate for the material.

The target feed rate may indicate a speed at which additive manufacturing system 100 produces the structure. In some embodiments, printing manager 1912 is configured to use the measured rheology of the material to determine the target feed rate. Printing manager 1912 may then use the target feed rate to determine any of the mixture output amount (e.g., the target feed rate), the motor speeds, and/or the target delivery device position(s) (e.g., the path that concrete delivery devices 136 operate along, or portions of the path that concrete delivery devices 136 should not be operated to discharge material).

In some embodiments, controller 500 is also configured to provide mixing system 1700 with adjustments to the material to achieve the target rheology. For example, printing manager 1912 may compare the measured rheology to the target rheology and determine that moisture or additives should be added to the material to achieve the target or a desired rheology. Controller 500 may operate mixing system 1700 to provide a metered amount of water or a metered amount of additives to the mixture to achieve the target rheology. In other embodiments, controller 500 operates a user interface, a display device, a human machine interface, a display screen, etc., of mixing system 1700 to notify a technician or a worker that additional water (e.g., a particular amount) or additional additive (e.g., a particular amount) should be added to the material to achieve the target rheology.

Printing manager 1912 can determine the target delivery device position using a predetermined path (e.g., that is determined based on the structure model) or can determine the target delivery device position based on monitoring layers that have been previously provided by concrete delivery devices 136. For example, controller 500 may operate delivery device positioning system 1926 so that concrete delivery devices 136 travel along the predetermined path (e.g., while dispensing the material), or may operate delivery device positioning system 1926 so that concrete delivery devices 136 follow the previous deposition layer. Printing manager 1912 can use the vision system data, data from the one or more sensors 1920, etc., to identify a path that the previous deposition layer was deposited and operate delivery device positioning system 1926 so that concrete delivery devices 136 follow the path of the previous deposition layer (e.g., even if the path of the previous deposition layer deviates from a target path of the previous deposition layer).

In some embodiments, controller 500 is configured to use the predetermined path until a particular overall height of the structure has been produced. For example, controller 500 may use the predetermined path (e.g., as determined by printing manager 1912 based on the structure model) for the first n number of layers or until a threshold height $h_{threshold}$ of the structure has been produced. Controller 500 can monitor an absolute height of the concrete delivery devices 136 (e.g., relative to ground surface 102) to determine if the structure produced thus far has reached the threshold height $h_{threshold}$ (e.g., an absolute target height). Once the structure produced thus far has reached the threshold height $h_{threshold}$, controller 500 may use the vision system data, data from sensor 1920, data from a physical measurement system, or data from position sensor 1930 to determine a path of a previous deposition layer. Printing manager 1912 and control signal generator 1910 can then use the path of the previous deposition layer to operate the delivery device positioning system 1926 so that concrete delivery devices 136 follow the path of the previous deposition layer and dispense the material atop the previous deposition layer.

Figure 35:
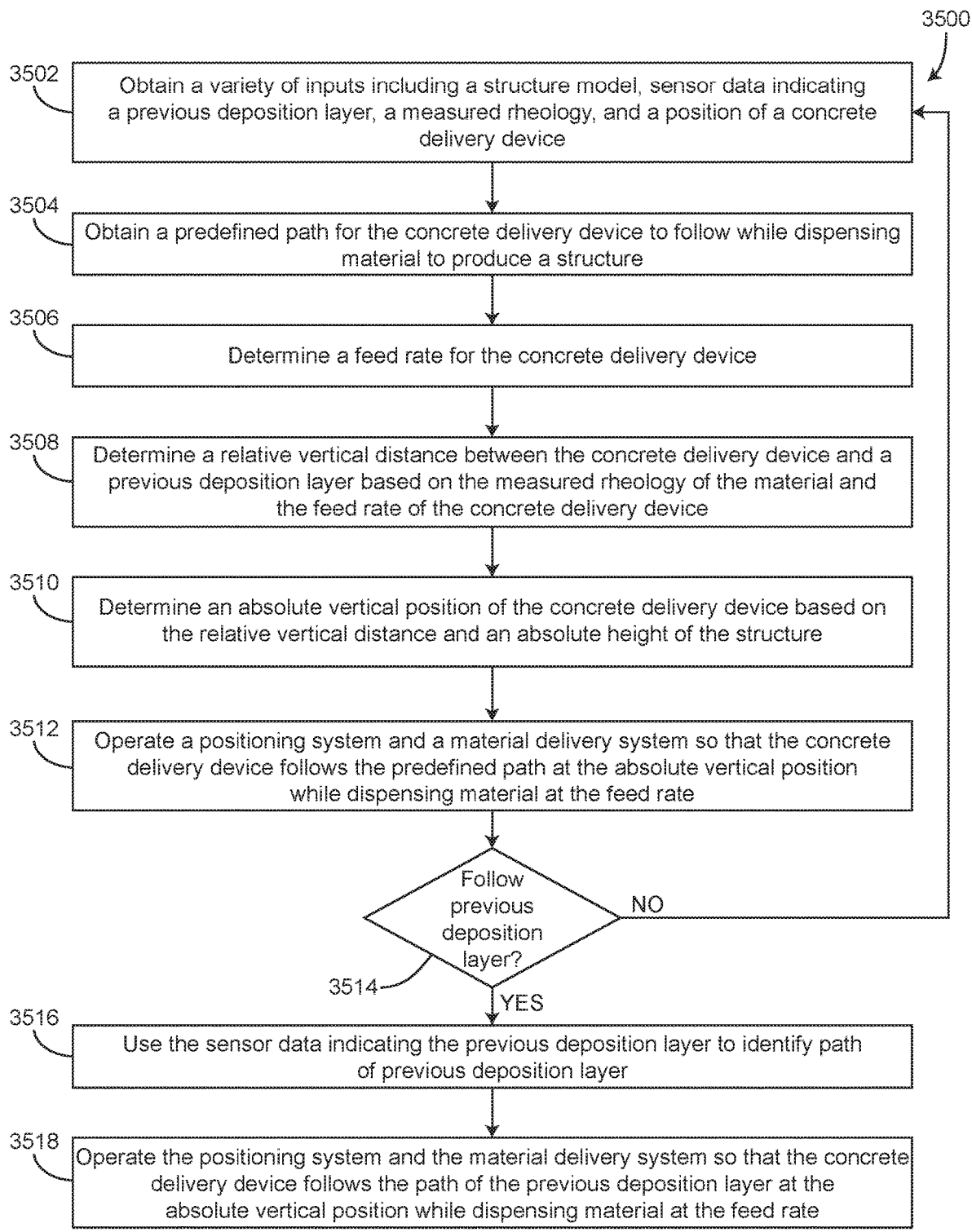
FIG. 35 is a flow diagram of a process for producing a structure using the additive manufacturing system of FIG. 1, according to an exemplary embodiment.

Referring particularly to FIG. 35, a flow diagram of a process 3500 for producing a concrete or cement structure using additive manufacturing is shown. Process 3500 includes steps 3502-3518 and can be performed by controller 500 and additive manufacturing system 100. Process 3500 may be similar to process 2000 and can include any of steps 2002-2030 or any of the techniques of process 2000.

Process 3500 includes obtaining a variety of inputs including a structure model, sensor data indicating a previous deposition layer, a measured rheology of material used for additive manufacturing, and a position of a concrete delivery device (step 3502), according to some embodiments. Step 3502 can be performed by controller 500, or more specifically, by printing manager 1912. The structure model may be a CAD model of a structure to be produced. The sensor data may be obtained from a camera, a vision system, a physical measurement system, a relative height sensor positioned at a concrete delivery device and configured to measure the relative distance between the previous deposition layer and the concrete delivery device, etc. The measured rheology may be obtained from a rheological sensor at a mixing system or at a material reservoir or may be provided to controller 500 via a user interface. The position of the concrete delivery device can be obtained from a sensor (e.g., a GPS), or based on feedback from a system that is configured to adjust a spatial location or position of the concrete delivery device.

Process 3500 includes obtaining a predefined or pre-planned path for the concrete delivery device to follow while dispensing the material to produce a structure (step 3504), according to some embodiments. In some embodiments, step 3504 is performed by printing manager 1912. In some embodiments, step 3504 is performed by printing manager 1912 using or based on the structure model. For example, printing manager 1912 may analyze the structure model to determine one or more paths (e.g., print paths) that the concrete delivery device should follow while dispensing the material to produce the structure. In some embodiments, the path is a predefined path that is stored in memory 1906 of controller 500. In other embodiments, the path is provided to controller 500 from a user device, another computing device, a remote server, etc. The path may be a two dimensional or a three dimensional path.

Process 3500 includes determining a feed rate for the concrete delivery device (step 3506), according to some embodiments. Step 3506 can be performed by printing manager 1912. The feed rate can be determined based on a desired rate of producing the structure, the measured rheology of the material, etc. The feed rate may be converted to a motor speed and/or a motor torque for an auger or pump that operates to provide the material to the concrete delivery device (e.g., auger 1612 and/or auger motor 1614).

Process 3500 includes determining a relative vertical distance between the concrete delivery device and a previous deposition layer based on the measured rheology of the material and the feed rate of the concrete delivery device (step 3508), according to some embodiments. Step 3508 can be performed by controller 500, or more particularly, by printing manager 1912. Printing manager 1912 can use the measured rheology of the material in combination with the feed rate to determine a value of the relative vertical distance between the concrete delivery device and the previous deposition layer that achieves a desired output pressure of the material. This may result in improving a bond between the deposition layer and the previous deposition layer and can facilitate improved strength of the structure by forcing the material out of the concrete delivery device with a vertical downwards force so that the deposition layer is biased into engagement with the previous deposition layer.

Process 3500 includes determining an absolute vertical position of the concrete delivery device based on the relative vertical distance and an absolute height of the structure (step 3510), according to some embodiments. The absolute vertical position of the concrete delivery device can be a summation of the absolute height of the structure and the relative vertical distance. Step 3510 can be performed by printing manager 1912.

Process 3500 includes operating a position system and a material delivery system so that the concrete delivery device follows the predefined path at the absolute vertical position while dispensing material at the feed rate (step 3512), according to some embodiments. Step 3512 can be performed by controller 500, or more particularly, by control signal generator 1910, material delivery system 1924, and delivery device positioning system 1926.

Process 3500 includes determining if the concrete delivery device should follow the previous deposition layer or not (step 3514), according to some embodiments. Step 3514 can be performed by printing manager 1912. Step 3514 can include comparing a current height of the structure that has been produced thus far to a threshold height (e.g., a threshold absolute height of the structure). If the current height of the structure is substantially equal to or exceeds the threshold height (step 3514, "YES"), process 3500 may proceed to step 3516. If the current height of the structure is less than the threshold height (step 3514, "NO"), process 3500 may return to step 3502. In other embodiments, process 3500 proceeds to step 3516 in response to receiving a user input or a change of a setting indicating that the concrete delivery device should follow the previous deposition layer.

Process 3500 includes using the sensor data indicating the previous deposition layer to identify a path of the previous deposition layer (step 3516), according to some embodiments. The sensor data may be obtained from a camera, one or more lasers, a vision system, a physical measurement system, etc. Step 3516 may be performed by controller 500, or more particularly, by printing manager 1912.

Process 3500 includes operating the positioning system and the material delivery system so that the concrete delivery device follows the path of the previous deposition layer at the absolute vertical position while dispensing material at the feed rate (step 3518), according to some embodiments. Step 3518 can be performed so that the concrete delivery device tracks the previous deposition layer as the concrete delivery device operates to dispense a new deposition layer. Advantageously, operating the positioning system and the material delivery system facilitates ensuring that the new deposition layer is laid or dispensed directly onto the previous deposition layer. Process 3500 can include re-performing steps 3502 and 3506-3510 to determine new values of the feed rate, the relative vertical distance, and the absolute vertical position for use with performing step 3518.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

The invention claimed is:

1. An additive manufacturing system configured to produce a structure, the additive manufacturing system comprising:
   a base assembly;
   an elongated member fixedly coupled with the base assembly and extending upwards from the base assembly;
   a carriage rotatably coupled with the elongated member and configured to translate upwards along the elongated member; and
   a first member fixedly coupled with and extending outwards from the carriage and comprising a material dispensing device configured to dispense concrete as the carriage rotates relative to the elongated member, wherein the carriage is threadingly coupled with the elongated member and configured to cause rotation of the carriage relative to the elongated member in a first direction to cause translation of the carriage upwards along the elongated member.

2. The additive manufacturing system of claim 1, further comprising a second member fixedly coupled with and extending outwards from the carriage, the second member comprising a structural support dispensing apparatus, wherein the structural support dispensing apparatus is configured to provide structural supports to the dispensed concrete as the carriage, the first member, and the second member rotate relative to the elongated member.

3. The additive manufacturing system of claim 2, further comprising:
   a primary mover configured to drive the carriage, the first member, and the second member to rotate relative to the elongated member; and
   a controller configured to operate the primary mover to rotate the carriage, the first member, and the second member to rotate relative to the elongated member to form the structure.

4. The additive manufacturing system of claim 1, wherein the base assembly comprises:
   an orientation sensor configured to measure an orientation of the additive manufacturing system;
   a controller;
   a plurality of articulated support arms; and
   a plurality of support arm cylinders configured to extend and retract to articulate the plurality of articulated support arms;
   wherein the controller is configured to operate the plurality of support arm cylinders based on the orientation of the additive manufacturing system to automatically level the additive manufacturing system.

5. The additive manufacturing system of claim 1, further comprising a controller configured to:
   obtain a model of the structure and determine one or more paths for the material dispensing device based on the model;
   determine a feed rate for the material dispensing device based on a rheological property of the material; and
   at least one of (i) operate the additive manufacturing system so that the material delivery device follows the one or more paths while dispensing concrete at the feed rate or (ii) operate the additive manufacturing system so that the material delivery device follows a previous deposition layer while dispensing concrete at the feed rate.

6. The additive manufacturing system of claim 1, wherein the carriage is threadingly coupled with the elongated member so that rotation of the carriage relative to the elongated member drives the carriage to translate upwards along the elongated member, wherein concrete is dispensed by the material dispensing device in a spiral pattern as the carriage rotates relative to the elongated member and translates upwards along the elongated member.

7. The additive manufacturing system of claim 1, wherein each of the plurality of material dispensing devices are configured to independently translate along at least a portion of a length of the first member as the carriage and the first member rotate relative to the elongated member as the material dispensing device dispenses the concrete.

8. The additive manufacturing system of claim 1, wherein the elongated member comprises one a plurality of sections, wherein each of the plurality of sections are removably coupled with adjacent sections to form the elongated member.

9. The additive manufacturing system of claim 1, wherein the additive manufacturing system is configured to produce structures of various heights and various diameters.

10. The additive manufacturing system of claim 1, wherein the carriage and the first member are configured to translate relative to the elongated member independently of rotation of the carriage and the first member relative to the elongated member.

11. The additive manufacturing system of claim 1, wherein the material dispensing device is a first material dispensing device, wherein the additive manufacturing system further comprises a second material dispensing device, wherein the first material dispensing device and the second material dispensing device are offset a distance from each other along the first member, the first material dispensing device configured to dispense the concrete along a first path and the second material dispensing device configured to dispense the concrete along a second path.

12. The additive manufacturing system of claim 11, further comprising a third material dispensing device, wherein the third material dispensing device is positioned between the first material dispensing device and the second material dispensing device and is configured to reciprocatingly translate between the first material dispensing device and the second material dispensing device while dispensing the concrete as the carriage and the first member rotate relative to the central member.

13. The additive manufacturing system of claim further comprising:
a second member extending from the carriage; and
a structural support dispensing apparatus configured to provide structural supports to the dispensed concrete as the first member, the carriage, and the second member rotate relative to the elongated member.

14. The additive manufacturing system of claim 1, wherein the additive manufacturing system is configured to produce structures over twenty-five feet in height.

15. The additive manufacturing system of claim 1, wherein the material dispensing device comprises a rheological sensor, the rheological sensor configured to measure a rheological property of the concrete dispensed by the material dispensing device.

16. A method for manufacturing a concrete tower, the method comprising: providing an additive manufacturing system at a job site, the additive manufacturing system comprising a base assembly, an elongated member coupled with and extending upwards from the base assembly, a carriage configured to rotate about and travel along the elongated member, and a material dispensing device configured to dispense concrete;
operating the additive manufacturing system to drive the carriage to rotate about and travel upwards along the elongated member; and
operating the material dispensing device to dispense concrete in a circular pattern as the carriage rotates and travels upwards along the elongated member,
wherein the carriage is threadingly coupled with the elongated member and configured to cause rotation of the carriage relative to the elongated member in a first direction to cause translation of the carriage upwards along the elongated member.

17. The method of claim 16, further comprising:
providing a digital model of the concrete tower to be produced by the additive manufacturing system, the digital model comprising a diameter, a height, and a wall thickness of the concrete tower to be produced by the additive manufacturing system; and
using the diameter of the digital model to determine a position of the material dispensing device relative to the elongated member.

18. The method of claim 16, further comprising providing a structural support member to the dispensed concrete via a structural support member delivery device.

19. An additive manufacturing system configured to produce a structure, the additive manufacturing system comprising:
a base assembly;
a central member fixedly coupled with the base assembly and extending upwards from the base assembly;
a carriage rotatably coupled with the central member and configured to translate upwards along the elongated member; and
a first member fixedly coupled with and extending outwards from the carriage and comprising a material dispensing device configured to dispense a slurry material as the carriage rotates relative to the elongated member;
wherein the carriage is threadingly coupled with the elongated member and configured to cause rotation of the carriage relative to the elongated member in a first direction to cause translation of the carriage upwards along the elongated member.

* * * * *